(12) United States Patent
Kundracik et al.

(10) Patent No.: US 11,034,036 B2
(45) Date of Patent: Jun. 15, 2021

(54) TOOL HEADS FOR SHEARING OPERATIONS

(71) Applicant: Ridge Tool Company, Elyria, OH (US)

(72) Inventors: Richard M. Kundracik, Elyria, OH (US); Matthew Bertram, Medina, OH (US); Evan T. Foreman, Elyria, OH (US); Robert M. Baracskai, Ridgeville, OH (US); Sachin Dakare, Maharashtra (IN)

(73) Assignee: Ridge Tool Company, Elyria, OH (US)

( * ) Notice: Subject to any disclaimer, the term of this patent is extended or adjusted under 35 U.S.C. 154(b) by 158 days.

(21) Appl. No.: 16/592,941

(22) Filed: Oct. 4, 2019

(65) Prior Publication Data
US 2020/0171683 A1    Jun. 4, 2020

Related U.S. Application Data

(60) Provisional application No. 62/772,844, filed on Nov. 29, 2018.

(30) Foreign Application Priority Data

Aug. 3, 2019    (IN) .............................. 201921031457

(51) Int. Cl.
*B26B 15/00*    (2006.01)

(52) U.S. Cl.
CPC ............. *B26B 15/00* (2013.01); *Y10T 83/404* (2015.04); *Y10T 83/412* (2015.04)

(58) Field of Classification Search
CPC ..... Y10T 83/404; Y10T 83/412; Y10T 83/42; B26B 15/00; B23D 15/00; B23D 15/02;
(Continued)

(56) References Cited

U.S. PATENT DOCUMENTS 2,329,387 A * 9/1943 Brenning ............. B23D 29/023
30/229
4,130,037 A    12/1978 Matthews
(Continued)

FOREIGN PATENT DOCUMENTS

CN    203992603 U    12/2014
DE    19537994 C2    2/2000
(Continued)

OTHER PUBLICATIONS

Office Action and Search Report dated Dec. 28, 2020; Application CN 201911173268.4; 10 pages.
(Continued)

*Primary Examiner* — Phong H Nguyen
(74) *Attorney, Agent, or Firm* — Mark E. Bandy; Rankin Hill & Clark, LLP

(57) ABSTRACT

Shear tools are described that are driven by a power assembly. In one version, the shear tools include a pivotally movable pair of lever arms. Upon activation of the power tool, the lever arms of the shear tool are pivotally displaced and urge a die along a shearing plane relative to another stationary die retained by the shear tool. In another version, the shear tools include a carriage and link assembly. Upon engagement and activation with a power assembly or power tool, a movable die is urged past a stationary die. Also described are systems and related methods utilizing the shear tools which enable convenient shearing or severing of workpieces such as strut channel.

46 Claims, 17 Drawing Sheets

(58) Field of Classification Search
CPC ........ B23D 15/04; B23D 23/00; B23D 23/02; B23D 23/04; B23D 29/00; B23D 2015/007
USPC .................. 30/228, 194, 229, 173, 182, 208
See application file for complete search history.

(56) References Cited

U.S. PATENT DOCUMENTS

| | | | |
|---|---|---|---|
| 4,506,445 A * | 3/1985 | Esten | B23D 29/002 30/228 |
| 5,125,158 A | 6/1992 | Casebolt et al. | |
| 6,230,542 B1 * | 5/2001 | Frenken | B23D 23/00 30/228 |
| 6,938,531 B2 | 9/2005 | Yoshimizu et al. | |
| 7,216,573 B2 | 5/2007 | Friend | |
| 7,634,859 B2 * | 12/2009 | Amherd | B23D 23/00 30/228 |
| 9,184,548 B2 * | 11/2015 | Hutchfield | B25B 27/146 |
| 9,209,585 B2 * | 12/2015 | Houser | H01R 43/0427 |
| 2005/0166740 A1 | 8/2005 | Marocco | |
| 2011/0078904 A1 | 4/2011 | Lucente | |
| 2013/0186246 A1 | 7/2013 | Franze | |
| 2018/0272445 A1 | 9/2018 | Perkins | |

FOREIGN PATENT DOCUMENTS

| | | |
|---|---|---|
| DE | 202004001662 U1 | 6/2005 |
| EP | 1599308 | 11/2005 |

OTHER PUBLICATIONS

Shear 30T Brochure ; 11 pages.
Wilton Strut Cutter Starter Kit ; 1 page.
M-400 Manual Strut Cutter by Kamekura ; 2 pages.
M-40L Electric Strut Cutter by Kamekura ; 2 pages.
Scotchman Shearmaster ; https://scotchman.com/shearmaster/) ; 3 pages.

* cited by examiner

US 11,034,036 B2

TOOL HEADS FOR SHEARING OPERATIONS

CROSS REFERENCES TO RELATED APPLICATIONS

This application claims priority from U.S. provisional application Ser. No. 62/772,844 filed on Nov. 29, 2018.

FIELD

The present subject matter relates to shearing or severing strut channel and similar workpieces using power tools and a tool head. The present subject matter also relates to methods of shearing using the tool heads.

BACKGROUND

Contractors use strut channel for the installation of electrical, plumbing, and HVAC components. Strut channel provides a convenient means for mounting these components. Strut channel hardware is universal and readily available for affixing components to strut channel. Hardware is also available for attaching the strut channel to other strut pieces for building framing. Strut channel is typically available in various cross sections and is also available with or without holes/slots. Strut channel is typically suspended from a ceiling by threaded rod, bolted to a wall, or constructed into framing for shelving. The channel is formed from mild steel but is also available in aluminum and stainless steel. Popular brands of strut are commercially available under the designations Unistrut®, PowerStrut®, B-Line® and Superstrut®. The industry standard method of cutting strut channel to a desired length is by use of band saws, portable band saws, or reciprocating saws.

Recently, a few shearing machines have appeared in the market and have been used for severing strut channel. The advantages of shearing rather than cutting are speed, burr-free cuts, no sparks, and avoidance of metal chips which typically result from cutting. In addition, saw blades wear out quickly. In contrast, shearing blades or shearing tools typically exhibit relatively long lifetimes and do not need frequent replacement.

Although satisfactory in many regards, a number of disadvantages exist with currently known shear tools. Strut shearing tools are generally dedicated to a specific shearing application. Thus, typical strut shearing tools are limited to severing strut channel and can not be used for other non-shearing operations at many jobsites such as for example making press connections on plumbing lines. This limitation results in additional equipment being required and tool costs to the user. Accordingly, a need exists for a shearing system that is powered by a tool that many users may already have in their possession and/or which they use for non-shearing operations.

Current high tonnage equipment options for shearing strut channel are heavy and not easily moved around the job site. Accordingly, a need exists for a high tonnage shearing system that is portable.

Corded tool options for shearing strut require the use of a generator in a new construction application where power outlets are not available. Accordingly, a need exists for a system in which shearing could be performed using battery power.

Although some of the known shearing devices address some of the noted problems, none of these devices address all or at least a majority of the problems. Accordingly, a need exists for a new shearing tool system that provides an improved combination of reduced use time, ease and convenience in effort, lower cost, and greater tool access.

SUMMARY

The difficulties and drawbacks associated with previous approaches are addressed in the present subject matter as follows.

In one aspect, the present subject matter provides a shear tool adapted to be driven by a power assembly. The shear tool comprises a frame defining a first face, a second face oppositely directed from the first face, and an interior region defined by the frame. The interior region is accessible from at least one of the first face and the second face. The frame includes a distal end wall. The shear tool also comprises a pair of pivotally movable lever arms affixed to the frame, each lever arm defining a proximal region for contacting an actuation member of the power assembly and a distal end directed to the interior region. The interior region of the frame is sized to receive a first die positioned in the interior region and allow linear movement of the first die upon contact with the distal ends of the pair of lever arms. The shear tool also comprises provisions for retaining a second die to the frame.

In another aspect, the present subject matter provides a tool system comprising a power assembly including a body, a handle, and a motor. The tool system also comprises a shear tool including a frame defining a first face, a second face oppositely directed from the first face, and an interior region. The interior region is accessible from at least one of the first face and the second face. The frame includes a distal end wall. The shear tool also includes a pair of pivotally movable lever arms affixed to the frame. Each lever arm defines a proximal region for contacting an actuation member of the power assembly and a distal end directed to the interior region defined by the frame. The interior region of the frame is sized to receive a first die positioned in the interior region and allow linear movement of the first die upon contact with the distal ends of the pair of lever arms. The shear tool also includes provisions for retaining a second die to the frame.

In yet another aspect, the present subject matter provides a shear tool adapted to be driven by a power assembly. The shear tool comprises a frame defining a first face, a second face oppositely directed from the first face, and an interior region. The interior region is accessible from at least one of the first face and the second face. The shear tool also comprises a pair of pivotally movable lever arms affixed to the frame. Each lever arm defines a proximal region for contacting an actuation member of the power assembly and a distal end directed to the interior region defined by the frame. Each lever arm of the pair of lever arms includes a cam surface in the proximal region for contacting the actuation member of the power assembly. The interior region of the frame is sized to receive a first die positioned in the interior region and allow linear movement of the first die upon contact with the distal ends of the pair of lever arms. The shear tool also comprises provisions for retaining a second die to the frame.

In yet another aspect, the present subject matter provides a tool system comprising a power assembly including a body, a handle, and a motor. The tool system also comprises a shear tool including a frame defining a first face, a second face oppositely directed from the first face, and an interior region. The interior region is accessible from at least one of the first face and the second face. The shear tool also includes a pair of pivotally movable lever arms affixed to the frame. Each lever arm defines a proximal region for contacting an actuation member of the power assembly and a distal end directed to the interior region defined by the frame. Each lever arm of the pair of lever arms includes a cam surface in the proximal region for contacting the actuation member of the power assembly. The interior region of the frame is sized to receive a first die positioned in the interior region and allow linear movement of the first die upon contact with the distal ends of the pair of lever arms. The shear tool also includes provisions for retaining a second die to the frame.

In yet another aspect, the present subject matter provides a method of shearing a workpiece comprising providing a tool system including a power assembly and a shear tool. The shear tool includes an assembly of pivotally movable lever arms configured to displace a first die positioned in the shear tool past a second die. The method also comprises inserting a workpiece in the first die and the second die. The method further comprises actuating the power assembly such that the lever arms of the shear tool are pivotally moved to contact the first die and displace the first die past the second die, whereby the workpiece is sheared.

In still another aspect, the present subject matter provides a shear tool adapted to be driven by a power assembly. The shear tool comprises a frame defining a first face, a second face oppositely directed from the first face, and an interior region. The shear tool also comprises a linearly movable carriage. The shear tool further comprises a link assembly coupled to the carriage. The link assembly defines at least one engagement face for contacting a die. The interior region of the frame is sized to receive a first die positioned in the interior region and allow linear movement of the first die upon contact with the at least one engagement face of the link assembly. The shear tool also comprises provisions for retaining a second die to the frame.

In yet another aspect, the present subject matter provides a tool system comprising a power assembly including a body, a handle, and a motor. The tool system also comprises a shear tool including a frame defining a first face, a second face oppositely directed from the first face, and an interior region. The shear tool also includes a linearly movable carriage, and a link assembly coupled to the carriage. The link assembly defines at least one engagement face for contacting a die. The interior region of the frame is sized to receive a first die positioned in the interior region and allow linear movement of the first die upon contact with the at least one engagement face of the link assembly. The shear tool also includes provisions for retaining a second die to the frame.

In yet another aspect, the present subject matter provides a method of shearing a workpiece comprising providing a tool system including a power assembly and a shear tool. The shear tool includes a carriage and a link assembly coupled to the carriage and configured to displace a first die positioned in the shear tool past a second die. The method also comprises inserting a workpiece in the first die and the second die. The method further comprises actuating the power assembly such that the link assembly of the shear tool is pivotally moved to contact the first die and displace the first die past the second die, whereby the workpiece is sheared.

As will be realized, the subject matter described herein is capable of other and different embodiments and its several details are capable of modifications in various respects, all without departing from the claimed subject matter. Accordingly, the drawings and description are to be regarded as illustrative and not restrictive.

DETAILED DESCRIPTION OF THE EMBODIMENTS

Figure 1:
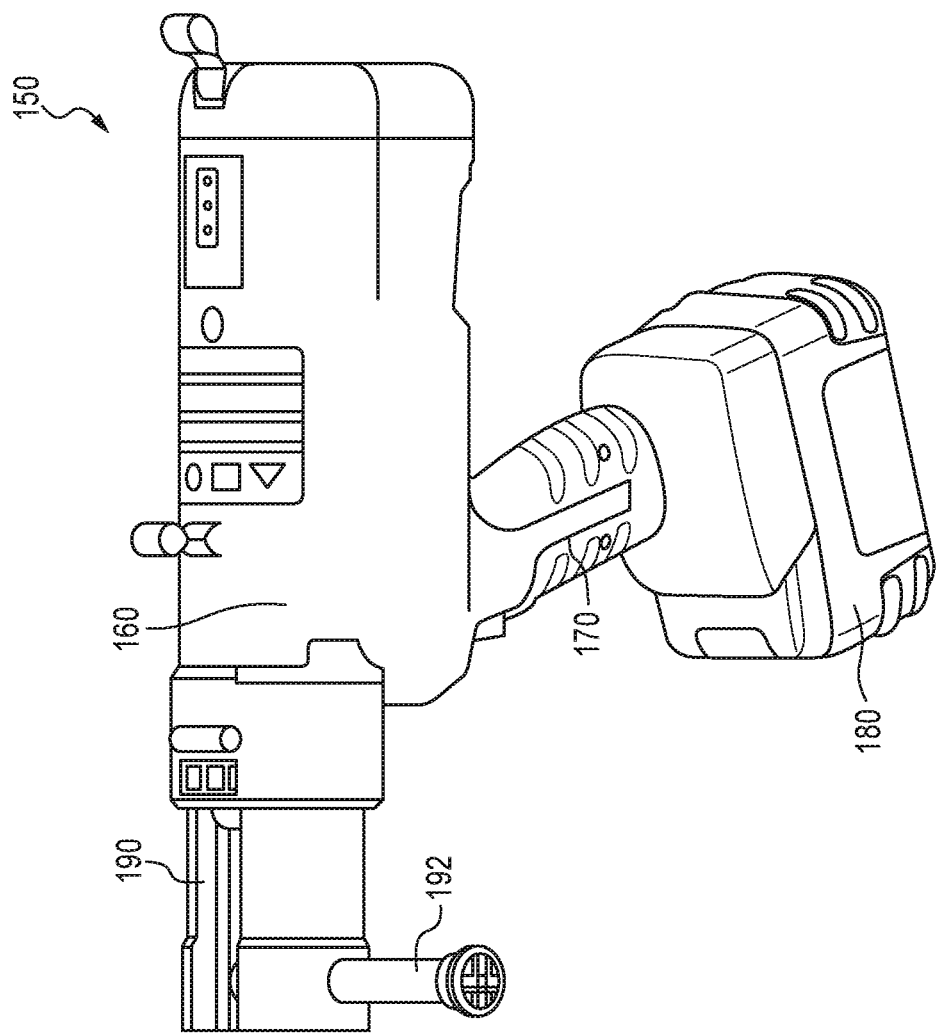
FIG. 1 is a schematic illustration showing a tool system of the present subject matter including a detachable shearing tool head and a press tool.
Figure 1:
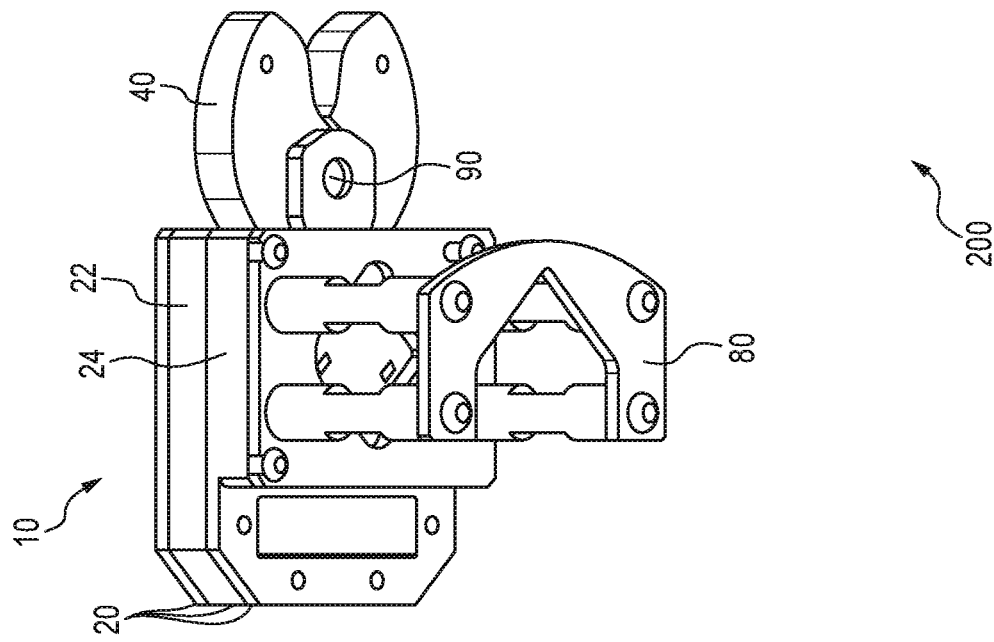

The present subject matter provides shear tools and more particularly, a shearing tool head that receives a workpiece such as strut channel, and shears or severs the workpiece. In many embodiments, the shear tool or tool head is engageable with a power tool such as a handheld press tool. In certain embodiments, upon activation of the power tool, an assembly of pivotally movable lever arms and a linearly positionable die of the shear tool, are displaced to shear or otherwise sever the workpiece such as strut channel positioned in the tool head. In other embodiments, upon activation of the power tool, a carriage, a link assembly, and a linearly positionable die of the shear tool, are displaced to shear or sever the workpiece or strut channel. The present subject matter also provides tool systems comprising the shear tools. The present subject matter additionally provides various methods utilizing the shear tools and tool systems.

In many embodiments, the shear tool utilizes one or more actuation elements such as the rollers from the press tool to displace the lever arms of the shear tool which feature a cam arrangement. The rollers ride along respective lever arm cam surfaces to rotate the lever arms of the shear tool about a pivot point. The pivot point can be provided by an axle and/or sleeve that seats in recesses of side plates and/or frame components of the shear tool. The axle or sleeve serves as the "pin" about which the lever arms rotate. The axle or sleeve also serves as a connection member between the press tool and the shear tool. In many embodiments, the shear tool utilizes a bolt, pin, or other member that slides through the sleeve to connect the shear tool head to the power tool. The strut shearing head additionally utilizes two or more dies that each contain a strut channel shaped profile. The lever arms contact a die retained in the shear tool so that as the lever arms rotate, the pair of lever arms push one of the dies forward. Prior to use, the strut channel is slid through the profile of both dies. To sever the strut channel, one die remains stationary, while the other die is pushed forward causing the strut to be sheared along the plane between the two dies. The strut channel can be supported by an optional arm bracket to promote straightness of cut, and this bracket can quickly be rotated out of the way to access and change dies. The control circuitry of many power tools shuts the tool off when electrical current drops below a predetermined value. In certain embodiments, the shear tool head additionally comprises a spring dampening system that receives the die undergoing displacement when shearing strut. This dampening system keeps electrical current draw from excessively dropping and allows the power tool to run to a hard stop. When the power tool contacts the hard stop it automatically retracts to its home position. As known to those skilled in the art, the term "home position" refers to a fully retracted or full default position. These aspects are described in greater detail herein.

A wide array of power tools can be used to drive the shear tool. Any standard press tool such as RIDGID RP340 or RP318 available from Ridge Tool Company which uses a fork and sliding pin system for the attachment of lever arm sets or heads to the press tool can be used. It is also contemplated that press tools manufactured and/or supplied by others could potentially be used to drive or power the shear tool heads of the present subject matter. It is also contemplated that other power tools besides press tools could be used so long as the tool includes one or more actuators that can impart pivotal movement to the pair of lever arms of the tool heads described herein. Generally, the strut shearing tool is positioned inline with the power tool to apply as much as 130 kN in mild steel strut channel shearing applications for example. It will be understood that different embodiments could generate greater force or less force.

Figure 2:
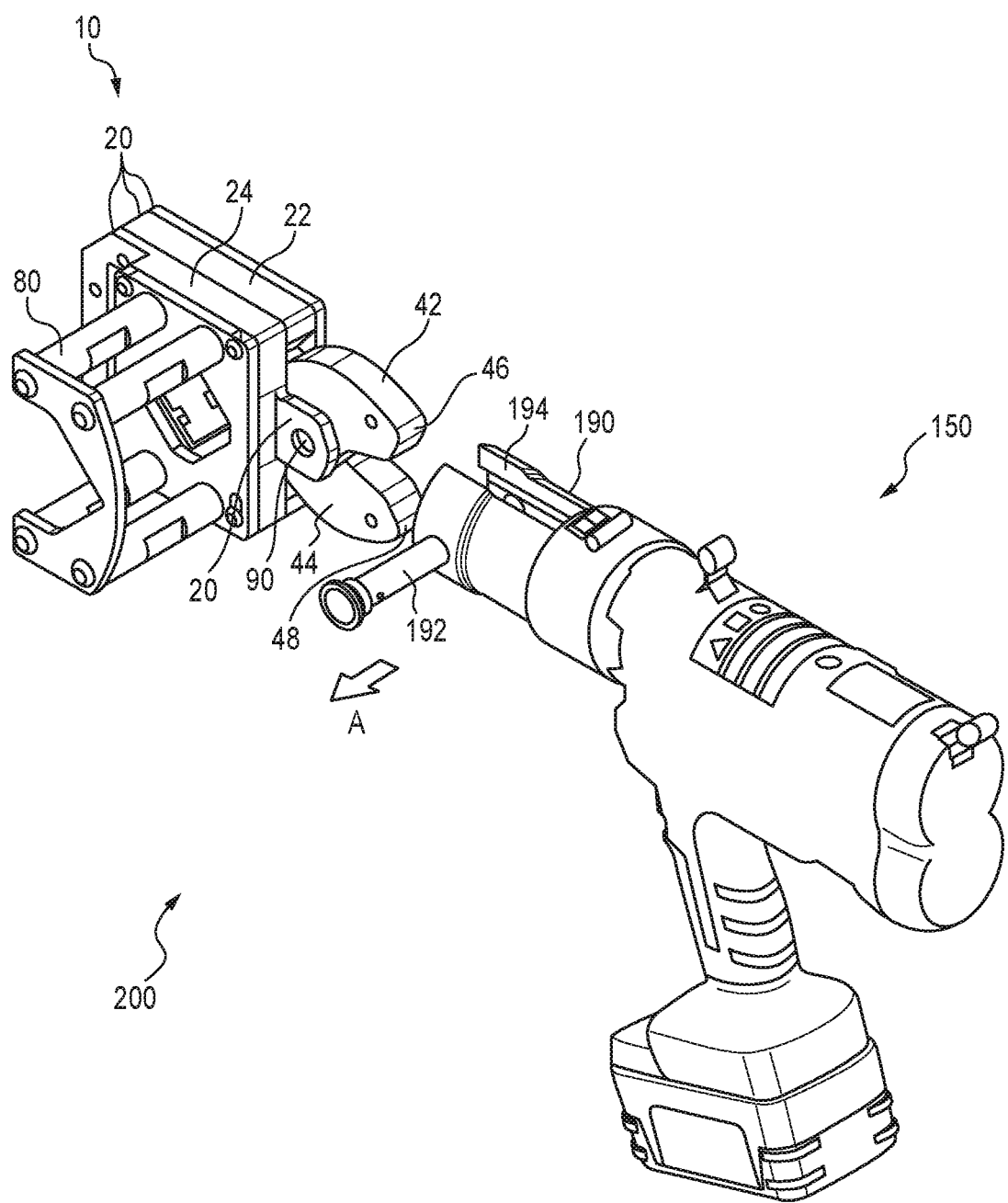
FIG. 2 shows the tool system of FIG. 1 in which the tool head is detached from the press tool.
Figure 3:
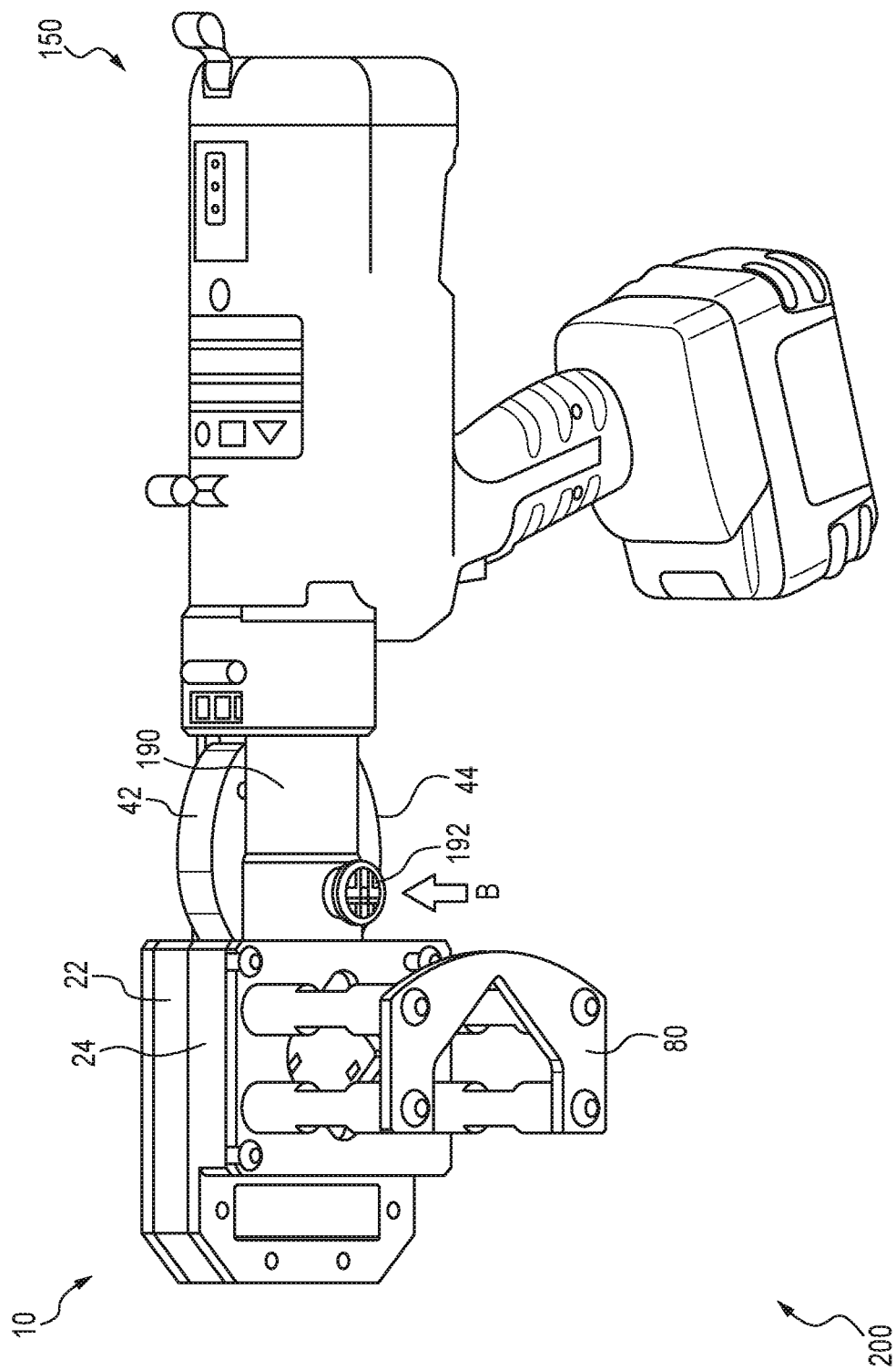
FIG. 3 shows the tool system of FIG. 1 in which the tool head is attached and engaged with the press tool.
Figure 4:
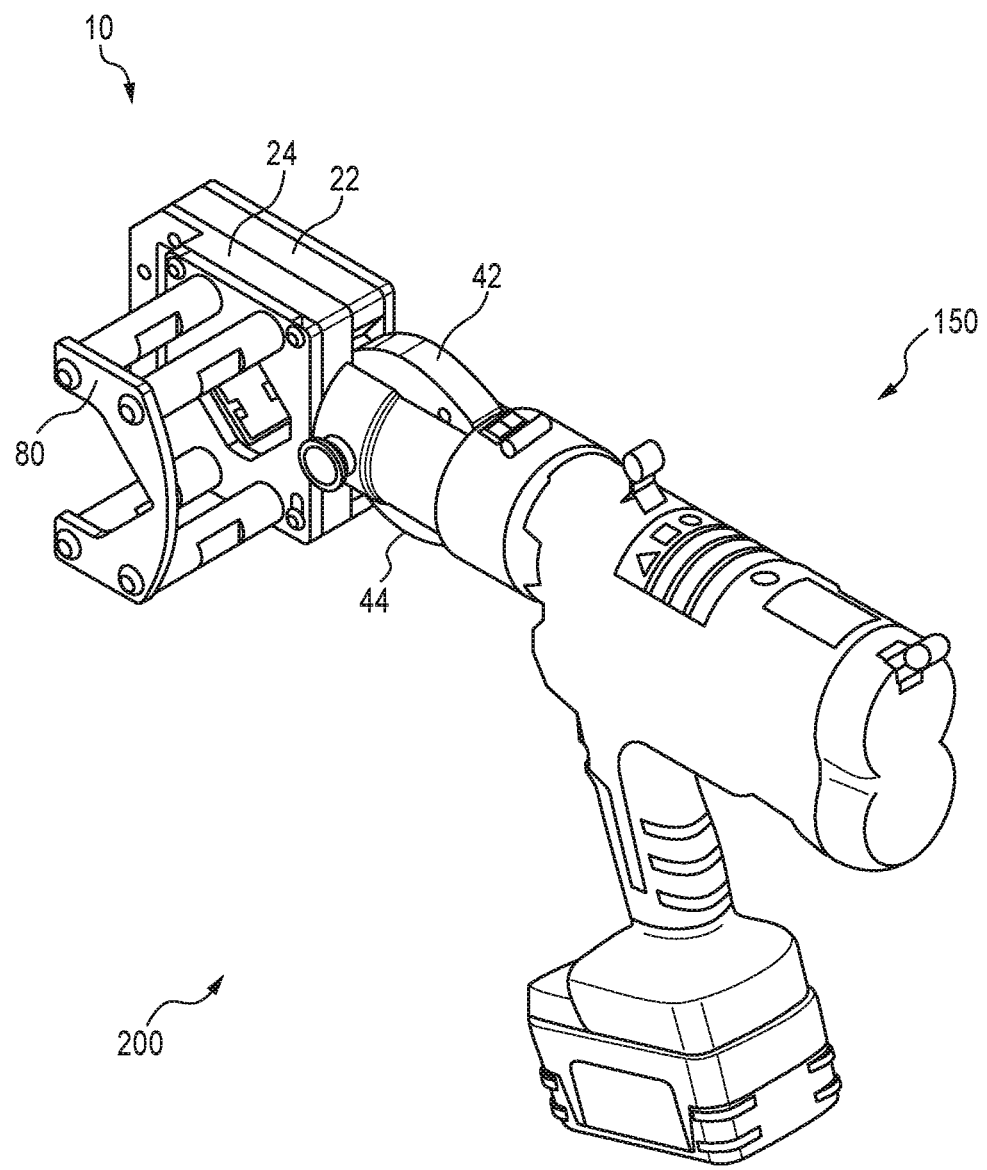
FIG. 4 is a perspective view of the tool system depicted in FIG. 3.
Figure 5:
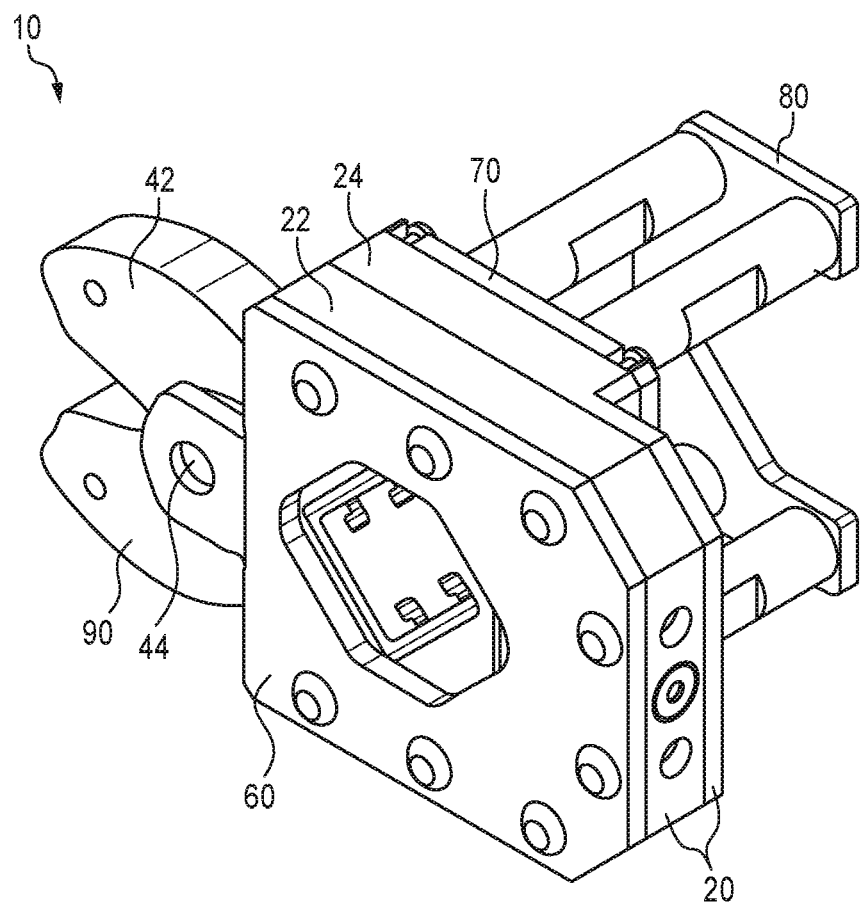
FIG. 5 is a detailed perspective view of the shearing tool head in accordance with the present subject matter.

FIGS. 1-4 schematically illustrate a tool system 200 comprising a shear tool or tool head 10 and a power assembly such as a power tool such as for example a press tool 150. The shear tool 10 is selectively engageable with the press tool 150. FIGS. 1-2 show the tool head 10 detached and separate from the press tool 150. FIGS. 3-4 illustrate the tool head 10 attached and engaged with the press tool 150.

The shear tool head 10 comprises a frame 20 including a first frame component 22 and a second frame component 24. The tool head 10 also comprises a pair of lever arms collectively depicted as 40. The pair of lever arms 40 are pivotally moveable about an axle/sleeve 90 described in greater detail herein. The lever arm pair 40 includes a first lever arm 42 and a second lever arm 44. The tool head 10 is shown with the optional arm bracket assembly 80 extending from the frame 20.

The press tool 150 comprises a body, enclosure, or housing 160, a handle 170, a battery or power pack 180, and a fork or nose 190 adapted for engaging a tool, tool head, or like assembly. Disposed within the interior of the housing 160 is an electric motor and drive assembly for imparting a drive force to the lever arm set, such as lever arm pair 40, engaged and received at the forward end or nose 190 of the tool 150. The fork 190 typically includes a selectively displaceable pin or bolt 192 which can be pulled outward or moved laterally to allow a tool or tool head to be received within the fork 190, and pushed or moved laterally in an opposite direction to engage and secure the tool or tool head within the fork 190. Referring to FIG. 2, engagement between the shear tool 10 and the press tool 150 is enabled by pulling the pin 192 in the direction of arrow A. This allows proximal ends 46, 48 of the pair of lever arms 40 to be received in a channel 194 of the fork 190 of the press tool 150. The shear tool head 10 is urged toward the press tool 150 until the sleeve 90, accessible via apertures in the frame 20 of the tool 10, is aligned with the pin 192. Upon positioning of the tool head 10 with the press tool 150 as shown in FIG. 3, the pin 192 is urged in the direction of arrow B such that the pin 192 is inserted in the sleeve 90 to thereby engage the tool head 10 with the press tool 150. References herein to "proximal" and "distal" are with regard to the location of the power tool, e.g., press tool 150. Thus for example, proximal portions of a component of the tool head 10 are closer to the power tool, as compared to distal portions of the component.

Details of the components, operation and assembly of the press tool 150 are disclosed in various patents, such as for example, U.S. Pat. No. 5,111,681 to Yasui et al.; U.S. Pat. No. 5,611,228 to Dummermuth; U.S. Pat. No. 6,000,680 to Kimura et al.; U.S. Pat. No. 6,202,290 to Kewitz et al.; U.S. Pat. No. 6,244,085 to Dummermuth; U.S. Pat. No. 6,276,186 to Frenken; U.S. Pat. No. 6,401,515 to Frenken; U.S. Pat. No. 6,510,719 to Goop; U.S. Pat. No. 6,510,723 to Amherd; U.S. Pat. No. 6,662,621 to Amherd; and U.S. Pat. No. 6,718,870 to Frenken.

Figure 6:
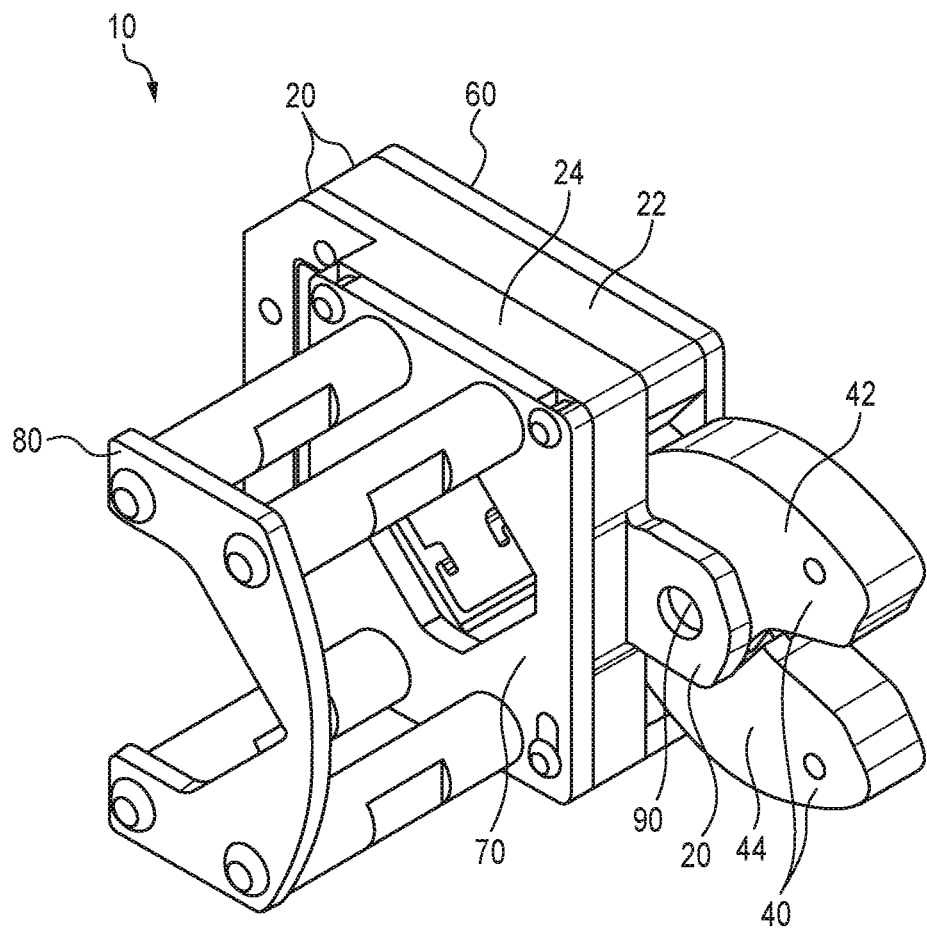
FIG. 6 is another detailed perspective view showing the tool head of FIG. 5.
Figure 7:
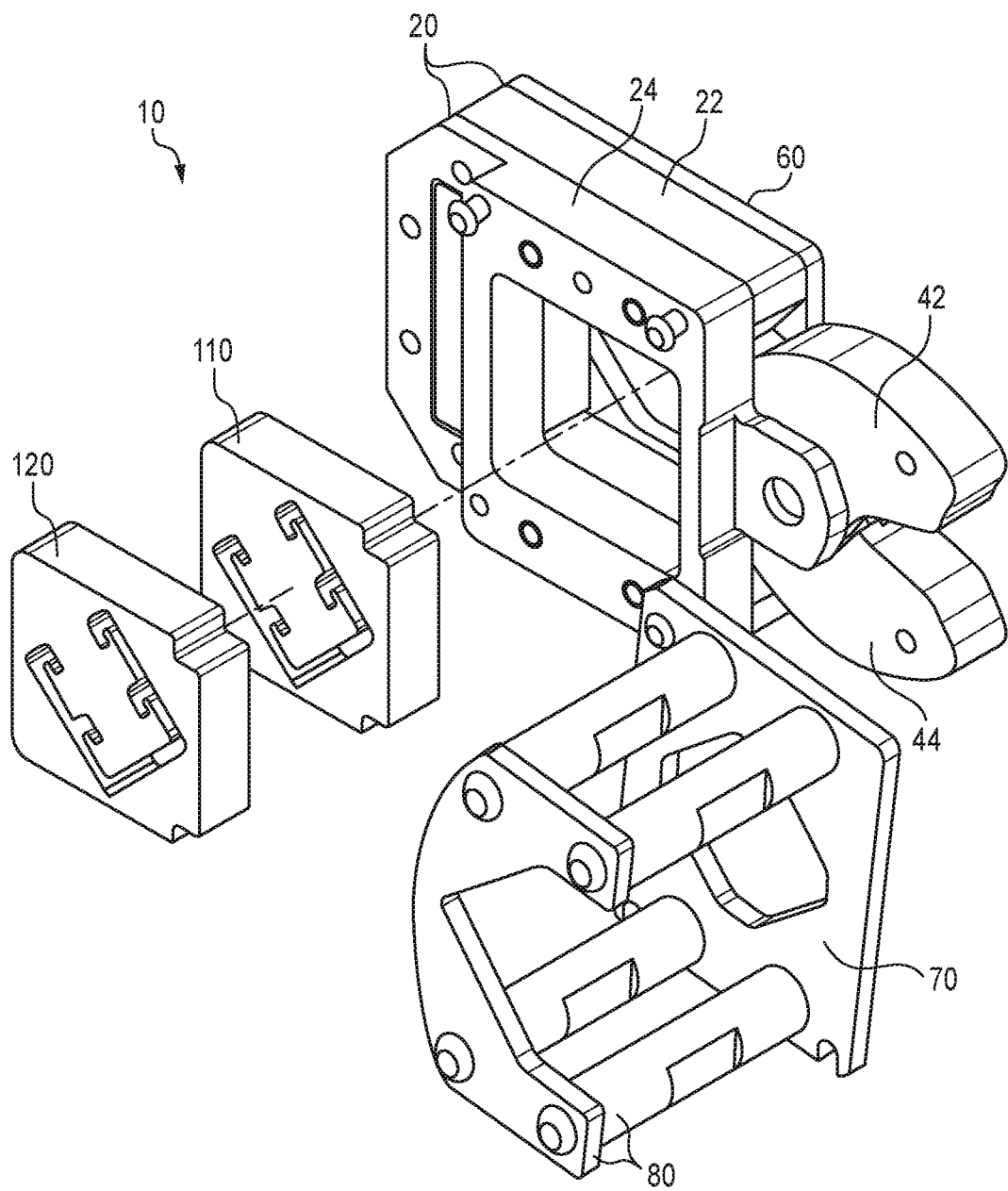
FIG. 7 is a schematic partially exploded view of the tool head of FIGS. 4 and 5.
Figure 8:
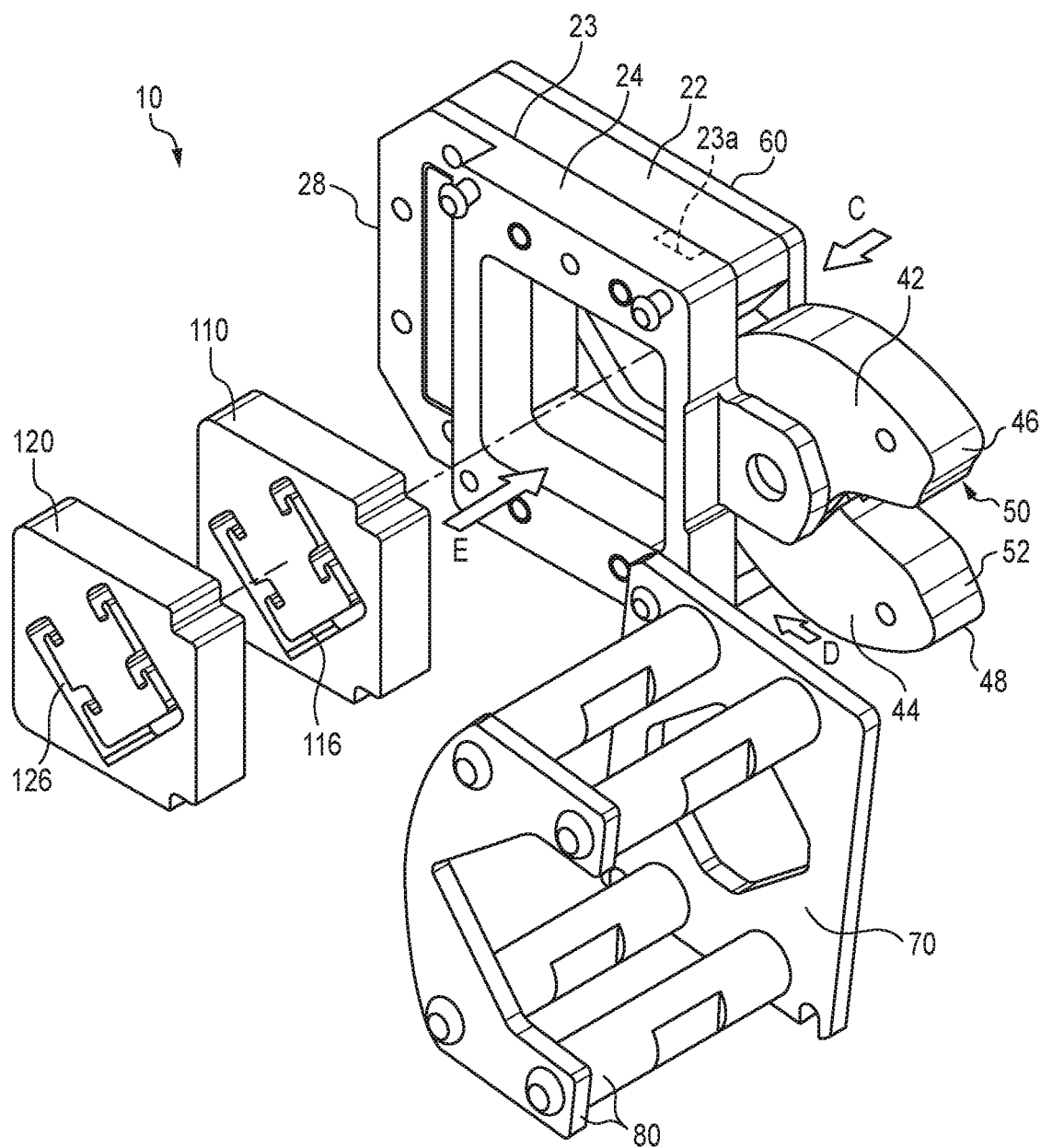
FIG. 8 is a similar view as that of FIG. 7 but identifying additional features of the tool head.

FIGS. 5-8 illustrate the shear tool head 10 in greater detail. The tool head 10 also includes a first side plate 60 affixed to the frame 20 and specifically, to the first frame component 22. The tool head 10 also includes a second side plate 70 affixed to the frame 20 and specifically, to the second frame component 24. As best shown in FIGS. 6-8, the pair of lever arms 40, i.e., the first lever arm 42 and the second lever arm 44, are pivotally affixed to the frame 20 and generally aligned and oriented to selectively contact a die positioned in the first frame component 22. The pair of lever arms are aligned with the first frame component 22 so that upon pivotal displacement of the lever arms 40 about the sleeve 90, distal ends (not shown) of the lever arms contact a first die 110 moveably positioned within the first frame component 22. The second frame component 24 receives and holds a second die 120 as described in greater detail herein. Each of the dies 110, 120 includes one or more openings extending through the die. In many embodiments, the openings are shaped and sized to receive a workpiece such as strut channel. Thus, the openings have a shape and size corresponding to the shape and size of a particular strut channel for example. Referring to FIG. 8, the first die 110 is shown with an opening 116, and the second die 120 is shown with an opening 126. In many versions, the size and shape of the openings in the pair of dies are the same or substantially so. However, the present subject matter includes the use of dies having dissimilar sized and/or shaped openings. If used, the optional arm bracket 80 is affixed adjacent to the second frame component 24 and in many embodiments, to the second side plate 70. FIG. 7 also illustrates rotational positioning of the arm bracket 80 for accessing the dies 110, 120. The frame 20 includes provisions for detachable engagement with a power tool as described in greater detail herein. The frame 20 also includes an end wall 28 generally at a distal location relative to the lever arms 42, 44. The end wall is typically opposite the provisions for detachable engagement.

Generally, each lever arm of the pair of lever arms, for example lever arms 42 and 44, includes one or more cam surface(s) in or along the proximal region of a respective lever arm for contacting corresponding actuation member(s) of the power tool, i.e., press tool. FIG. 8 illustrates representative cam surfaces. Specifically, lever arm 42 includes a cam surface 50 along its proximal region, and lever arm 44 includes a cam surface 52 along its proximal region. As shown in the referenced figures, the cam surfaces 50, 52 are generally directed toward one another and are configured to contact actuation elements such as rollers in a corresponding press tool. The cam surfaces 50, 52 can be tailored to provide a specific or desired displacement profile for the distal ends of the lever arms and thus result in a particular force application upon the die 110 movably retained in the frame component 22. This aspect enables a user to select and utilize a particular pair of lever arms having a desired cam arrangement to thereby provide a desired force profile for certain die(s) and/or shearing applications. Details of cam surfaces in lever arm sets used with press tools are provided in one or more of the following patents, such as for example, U.S. Pat. No. 7,155,955 to Bowles et al.; U.S. Pat. No. 7,188,508 to Bowles; U.S. Pat. No. 5,148,698 to Dischler; and patent publications for example U.S. Pat. Pub. No. 2018/0175575.

FIG. 8 also illustrates location of a shear plane 23. As will be understood, upon driving of the shear tool 10 by a press tool (not shown), the pair of lever arms 42, 44 are pivotally displaced thereby resulting in linear movement of the first die 110 within the first frame component 22. Linear movement of the die 110 is in a direction toward the end wall 28. As previously noted, the second die 120 is retained or otherwise held stationary with the second frame component 24. The shear plane 23 extends between the moving first die 110 and the stationary second die 120. Generally, the shear plane 23 also extends along the interface between the frame components 22, 24. In certain versions, a notch 23a or similar cut-out feature can be provided along or adjacent to the interface and shear plane 23. The notch 23a or cut-out feature enables a user to conveniently measure-off a desired length of workpiece or strut channel prior to shearing. That is, the user can axially position the strut channel in the dies and tool head and place a tabbed end of a typical tape measure in notch 23a so that a desired length of channel can be obtained by shearing.

Figure 9:
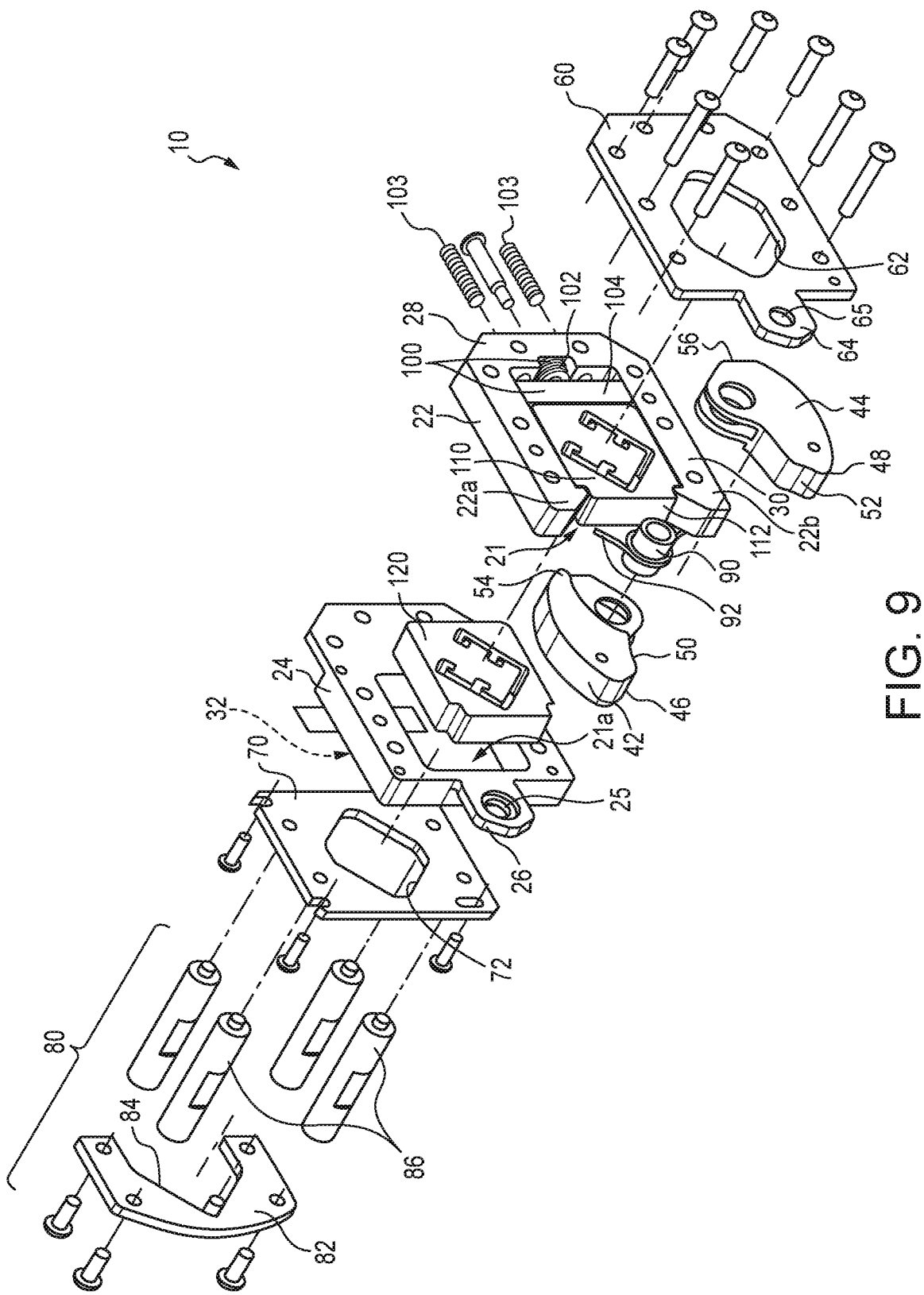
FIG. 9 is an exploded assembly view of the tool head of FIGS. 4-8.
Figure 10:
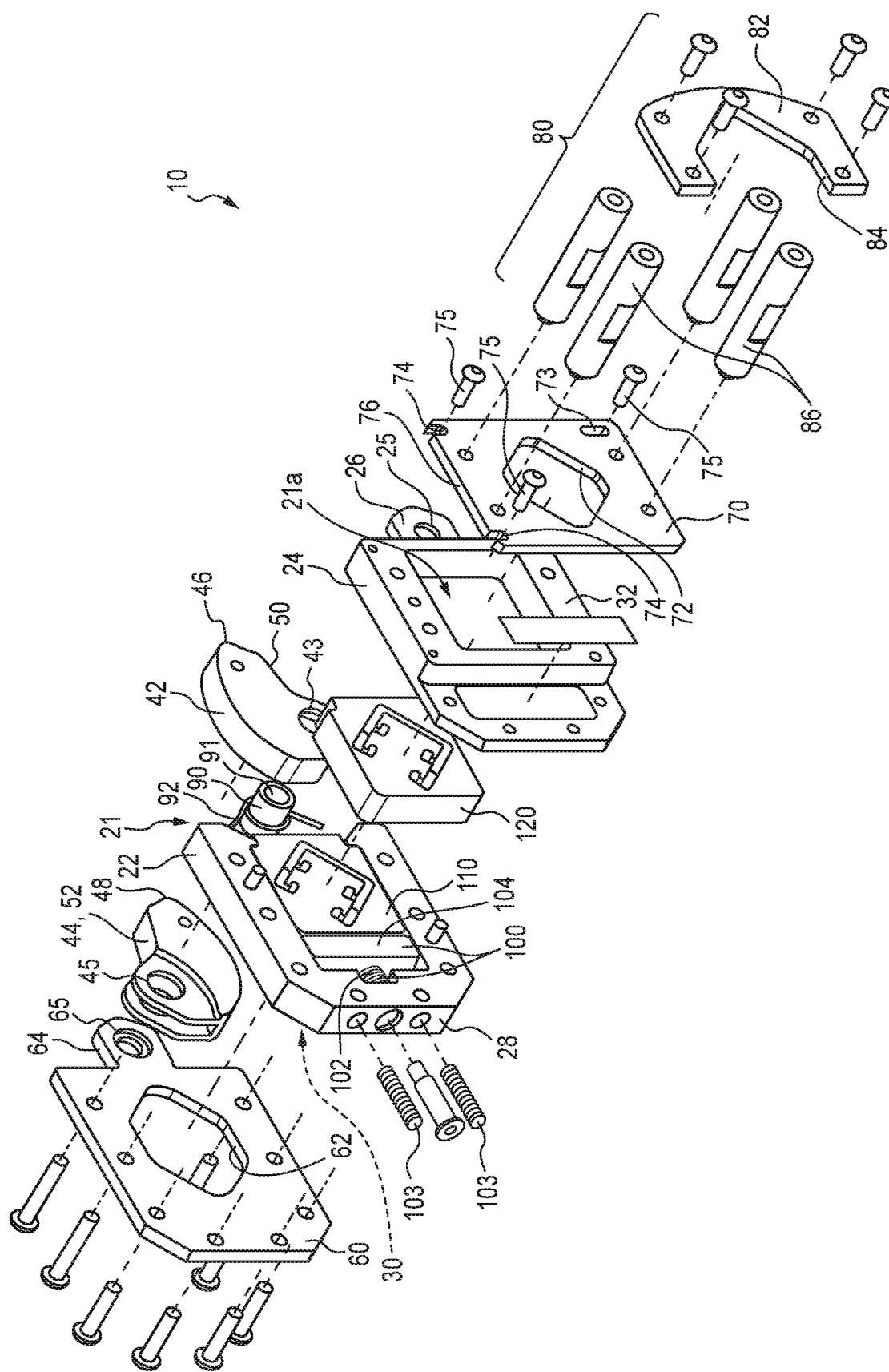
FIG. 10 is another exploded assembly view of the tool head of FIGS. 4-9.

FIGS. 9 and 10 are exploded assembly views of the shear tool head 10. These figures further illustrate a movable first die 110 positioned in a receiving region 21 of the first frame component 22. An optional dampening system 100 is shown which includes one or more slidable members 104 for contacting and generally moving with the first die 110 upon displacement of that die during a shearing operation. The dampening system 100 also includes one or more springs 102 disposed between the slidable member(s) 104 and the first frame component 22 and more particularly the end wall 28. A wide array of spring types and configurations can be used for springs 102. Compression springs 102 have been found useful. One or more adjustable members 103 can be provided to adjust the location of the hard stop for the travel of the first die 110 along the shear plane 23 relative to the second die 120 (see, e.g., FIG. 8). The present subject matter includes a wide array of provisions and features for the hard stop. For example, a hard stop could be provided by a projection or other structural feature of the shear tool which prevents further linear movement of the first die. Alternatively or in addition, a hard stop could be provided on one or more regions of the lever arms such as for example on the cam surface(s). This provision would provide a hard stop or limit the extent of pivotal movement of the lever arms without die(s) present in the tool head. Alternatively or in addition, a hard stop could be provided by configuring the lever arms to contact the frame 20 and particularly, the first frame component 22. Specifically in this version, as the actuator(s) of the power tool is extended thereby urging the lever arms 40 to a closed position, the outer region of each lever arm 42, 44 contacts a corresponding region of the first frame component 22. Additional details of this embodiment for a hard stop are described in association with FIGS. 9 and 10. The second die 120 is retained within a receiving region 21a of the second frame component 24. Typically, each of the first die 110 and the second die 120 is positioned within its respective receiving region 21, 21a by laterally placing the die therein. Specifically, FIG. 8 illustrates laterally positioning the dies 110, 120 within the interior of the frame 20, i.e., within the first and second frame components 22, 24 by moving the dies in the direction of arrow E. As shown, prior to such positioning of the dies, the side plate 70 and the optional arm bracket 80 are positioned away from the frame components 22, 24 to thereby allow access to the frame interior.

These figures also illustrate the lever arms 42 and 44 of the lever arm pair 40. Each lever arm defines an aperture through which the axle/sleeve 90 is inserted. The lever arms 42 and 44 are configured to pivotally rotate or move about the axle/sleeve 90. The axle/sleeve 90 thus functions as a member about which the lever arm pair 40 pivot or rotate, and also serves to maintain alignment of the lever arms 42, 44. In many embodiments, the axle/sleeve 90 also serves to reduce or prevent damage to the lever arms 42, 44. Upon attaching or engaging the shear tool head 10 to a power tool such as the press tool 150 having a pin or bolt 192, the pin or bolt 192 is inserted in an opening or more particularly a cylindrical hollow opening 91 extending through the axle/sleeve 90. A biasing element such as a spring 92 can be included to bias the lever arms 42, 44 to a desired pivotal position. A wide array of spring types and configurations can be used such as but not limited to a torsion spring. The spring(s) or biasing elements can be configured to bias the pair of lever arms to an open position or a closed position. In many applications biasing the pair of lever arms to an open position is preferred. Specifically, the first lever arm 42 defines an aperture 43 and the second lever arm 44 defines an aperture 45. As previously noted, upon assembly of the shear head 10 and positioning of the dies 110, 120 therein, distal ends of each lever arm contact a proximal region or face of the first die 110. Specifically as depicted in FIG. 9, the distal end 54 of the first lever arm 42 and the distal end 56 of the second lever arm 44 contact a proximal region 112 of the first die 110.

The first side plate 60 defines one or more openings 62 for receiving a workpiece such as strut channel to be sheared. Similarly, the second side plate 70 defines one or more openings 72 for receiving a workpiece, i.e., strut channel. The first side plate 60 is affixed to a first face 30 of the frame 20 and more particularly to a face of the first frame component 22. The second side plate 70 is affixed to a second face 32 of the frame 20 and more particularly to a face of the second frame component 24. The second face 32 is oppositely directed relative to the first face 30.

The optional arm bracket 80 can be provided in a wide array of different forms and configurations. In the version shown in FIGS. 9 and 10, the arm bracket 80 includes a laterally mounted support member 82 defining a channel or opening 84 for placement of a workpiece or strut channel therein, and a plurality of standoffs 86 extending between the second side plate 70 and the support member 82. The channel or opening 84 defined in the support member 82 is typically aligned with the opening 72 defined in the second side plate 70.

As previously noted, the shear tool 10 includes provisions for detachable engagement with the power tool, for example a press tool. In the embodiment of the referenced figures, the provisions include a mounting tab 64 extending from the first side plate 60 that defines an aperture 65. The provisions also include a mounting tab 26 defining an aperture 25 associated with the second frame component 24. The provisions also include the previously noted axle/sleeve 90. Upon assembly of the shear tool 10, the mounting tabs 64 and 26 of the first side plate 60 and the second frame component 24 are aligned with the sleeve 90 positioned between the tabs 64 and 26. The opening or cylindrical hollow opening 91 extending through the sleeve 90 is aligned with the openings 65 and 25 of the tabs. The longitudinal axis of the opening 91 is colinear with the axis of pivotal movement of the pair of lever arms 40 about the sleeve 90. As previously noted, the pair of lever arms 40 are pivotally mounted on the sleeve 90. Thus, the lever arms 40 are also positioned at least partially between the noted tabs 64 and 26.

In certain version of the tool heads, one or more guards or components are provided that cover or preclude access by a user's fingers for example, to location(s) at which the proximal regions of the lever arms move toward or contact peripheral regions of the frame of the tool head. Referring to FIGS. 8-10, potential pinch point(s) are depicted in FIG. 8 by arrows C and D. As will be understood, as the lever arms 42, 44 undergo pivotal movement, the regions between a lever arm and corresponding proximal portions of the frame component 22 undergo a reduction in volume and constitute potential pinch points. The configuration of certain versions of the tool heads and in particular of the frame component 22 significantly restrict these regions from access by a user's finger(s). In one version as shown in FIG. 9, proximal regions 22a and 22b of the frame component 22 are shaped to partially extend about the proximal region 112 of the first die 110, and may each include an inclined surface that is oriented toward outer regions of the lever arms 42, 44. Thus, the protective guard portions of the first frame component do not need to move with the lever arms, yet maintain a relatively close spacing from the lever arms, for example less than about 1/16 inch over the entire range of pivotal movement of the lever arms. The inwardly directed surfaces of the proximal regions 22a and 22b which may include all or a portion of the noted inclined surfaces, may also serve as a hard stop for closing of the lever arms, for example when shearing a workpiece. That is, upon such closing of the lever arms, outer regions of the pair of lever arms 40 may contact the noted surfaces of the first frame component 22 to thereby limit or preclude further pivotal movement of the lever arms 40.

Figure 11:
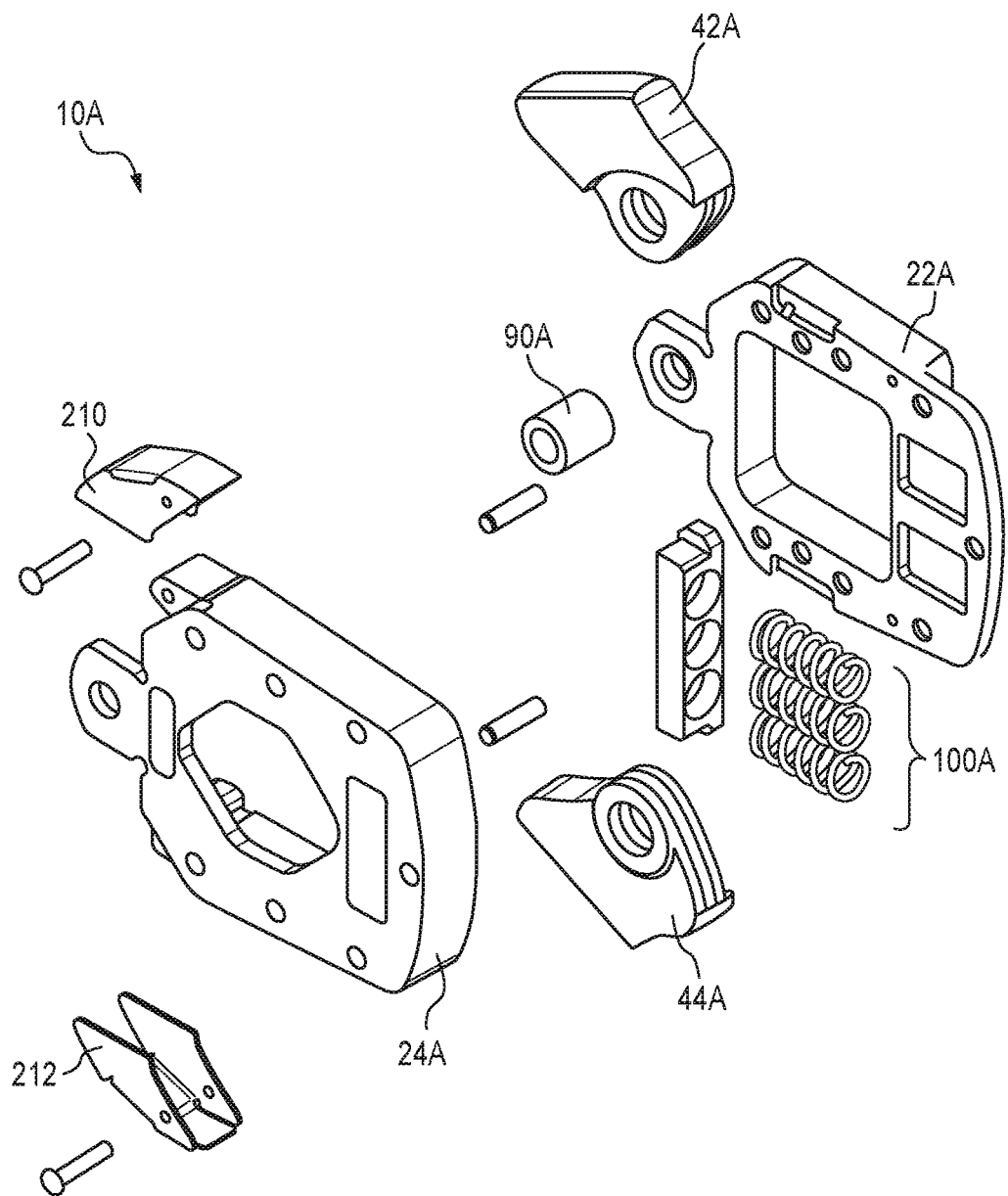
FIG. 11 is a partial exploded assembly view illustrating optional guard components of the tool head.

FIG. 11 is a partial exploded assembly view of another embodiment of a tool head 10A with optional guard components. Specifically, in this version components of the tool head 10A are designated with similar reference numbers to components in the previously described tool head 10 but with an "A" suffix. The optional guard components 210 and 212 are shown. The guard components 210, 212 are incorporated in the tool head 10A such that they are aligned within the plane of pivotal movement of the lever arms 42A and 44A. As previously described, the guard components 210, 212 cover and preclude access to potential pinch points associated with the tool head 10A. The guard components 210, 212 or variations thereof, can be used with any of the tool heads described herein such as for example tool head 10.

In certain versions of the tool heads, provisions can be included that enable one or both of the side plates and if used, the arm bracket, to be easily moved to provide greater access to the receiving region(s) of the frame, frame components, and/or the dies. Specifically and with reference to FIGS. 8-10, the side plate 70 can be configured to allow a user to laterally move the plate 70 relative to the frame 20 or more particularly the second frame component 24 and once laterally displaced, then rotated relative to the frame component 24 such that the interior region 21a of the frame component 24 can be readily accessed. Upon such rotational positioning of the plate 70, a user can more easily access the die(s) 110, 120 for example. If the arm bracket 80 is used, that assembly is also positioned with the plate 70 since the arm bracket 80 is affixed thereto. A user reverses the noted operations to secure the side plate 70 alongside the frame component 24. In this configuration, the side plate 70 defines a closed slot or aperture 73 and one or more open slot(s) or aperture(s) 74 accessible from an edge 76 of the plate 70. The slots 73, 74 are sized and shaped to receive the diameter of corresponding fasteners 75 that secure the side plate 70 to the second frame component 24.

FIGS. 12-16 schematically illustrate another embodiment of a tool head 310 in accordance with the present subject matter. The tool head 310 is adapted for use with a power or press tool such as the RIDGID RE 6 electrical cable termination tool available from Ridge Tool Company which uses a cylindrical interface and a linearly extendable ram for the attachment and actuation of heads to the press tool. It is also contemplated that press tools manufactured and/or supplied by others could potentially be used to drive or power the shear tool heads of the present subject matter. It is also contemplated that other power tools besides the noted press tool could be used so long as the tool includes one or more actuators that can impart linear movement to component(s) of the tool heads described herein.

Figure 12:
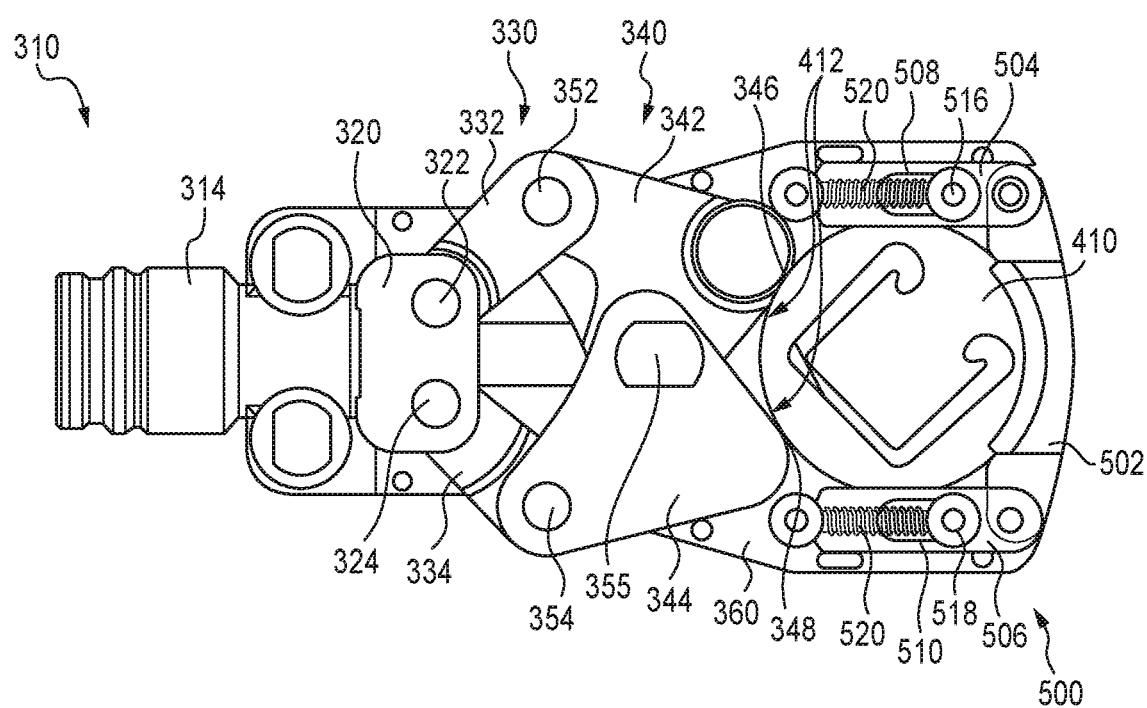
FIG. 12 is a schematic illustration of another tool head in accordance with the present subject matter.
Figure 13:
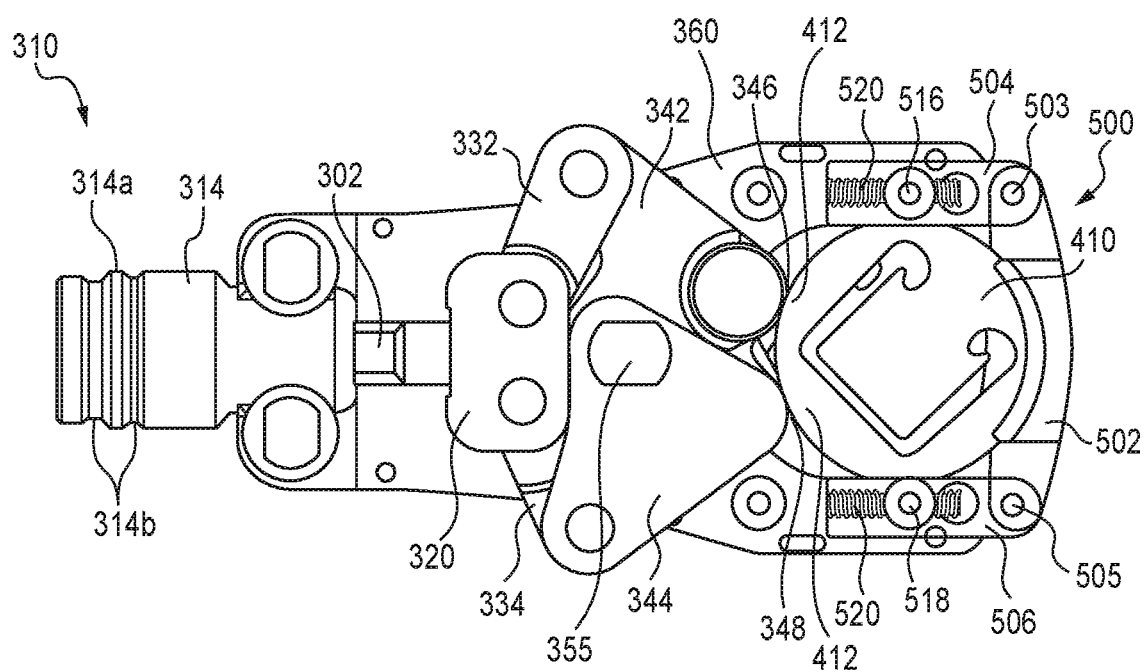
FIG. 13 shows the tool head of FIG. 12 in an extended position.
Figure 14:
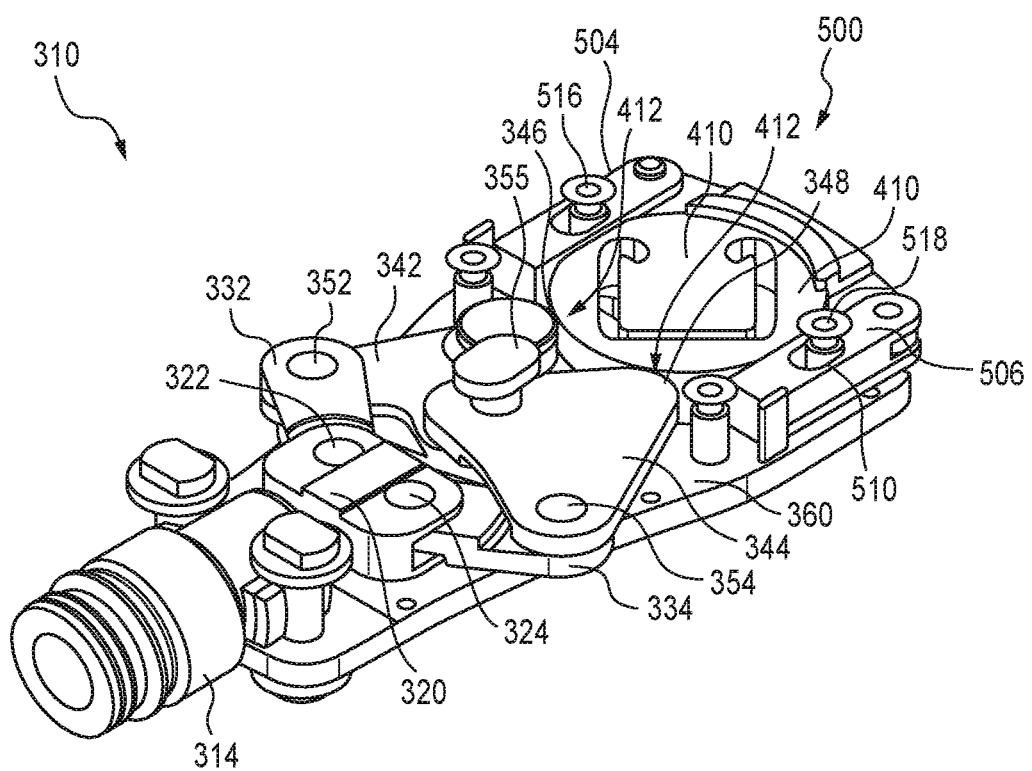
FIG. 14 is a perspective view of the tool head of FIG. 12 showing additional features.
Figure 15:
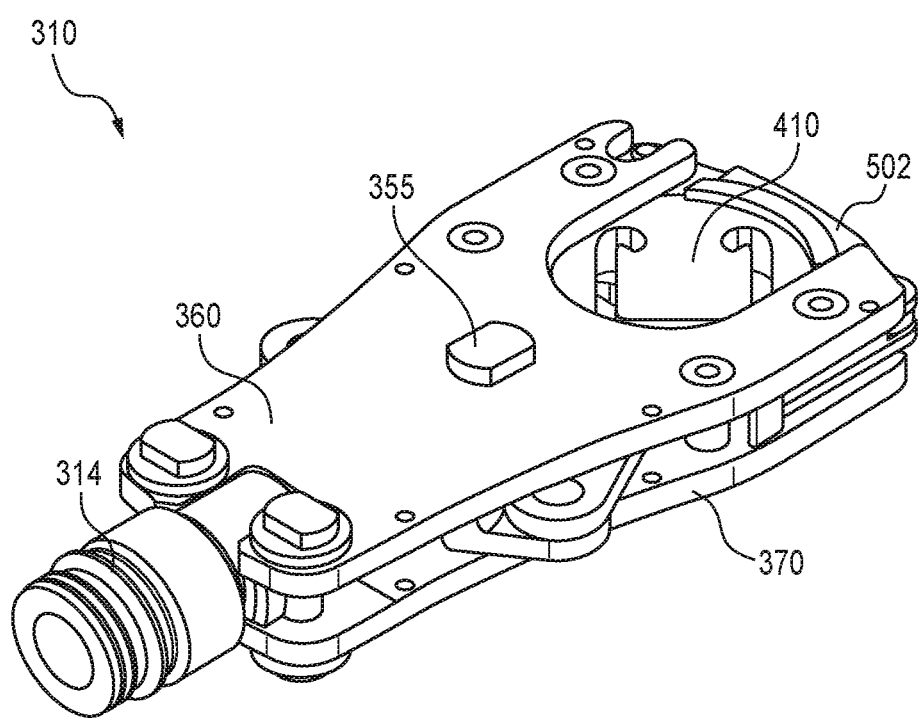
FIGS. 15 and 16 show the tool head of FIG. 12 in a fully assembled state.
Figure 16:
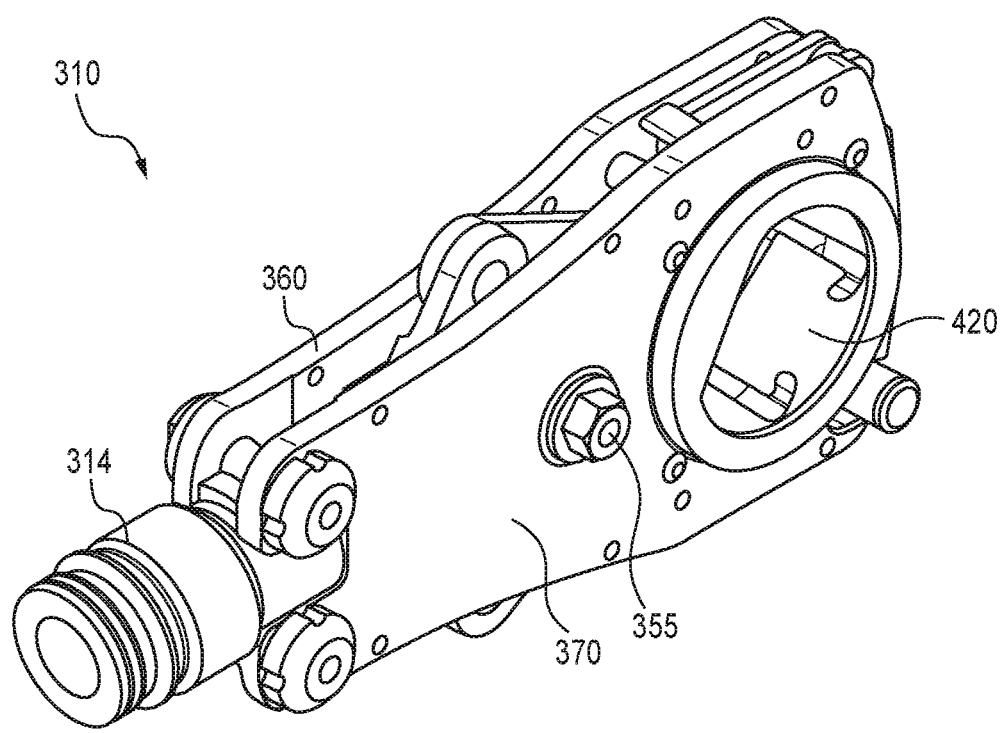

FIGS. 12-16 illustrate the tool head 310. Referring to FIGS. 15 and 16, showing the tool head 310 in its fully assembled state, the tool head 310 includes a frame which typically has a first side plate 360 and a second side plate 370 oriented generally parallel to the first side plate 360. It will be understood that the tool head 310 can utilize a wide array of components that constitute a frame for the tool head. Generally, the frame defines first and second faces and an interior region therebetween. As shown in FIGS. 12-14 in which the tool head 310 is partially disassembled, the side plates 360 and 370 generally enclose a carriage 320, and a link assembly that includes a plurality of carriage links 330, a shoulder post 355, and a plurality of die links 340. The carriage 320 and carriage links 330 are displaced to move a die 410 between the side plates 360, 370. The second side plate 370 retains another die 420. It will be understood that the present subject matter includes a wide array of provisions for retaining a second die to the frame or a side plate. The tool head 310 also includes a press tool interface 314 for selective and releasable engagement with a press tool such as the noted RE 6 press tool. In many versions, the press tool interface 314 can be configured and/or utilize a configuration of a shank part 13 described in U.S. Pat. No. 9,573,335. In many versions, the press tool interface is in the form of a generally cylindrical member defining a plurality of ridges 314a and depressions 314b along its outer circumferential surface. It will be understood that the tool head 310 is not limited to any particular configuration and instead may be sized and/or shaped to be used with a wide array of press tools or other tools.

FIGS. 12-14 illustrate the tool head 310 with the second side plate 370 removed. The carriage 320 is linearly positionable within the tool head 310 and upon engagement and actuation with a press tool is urged toward the dies 410, 420 by a powered ram 302 as depicted in FIG. 13 of the press tool engaged therewith (not shown). As will be understood, the powered ram 302 of the press tool is inserted into and extends through the press tool interface 314. The carriage 320 is coupled to two or more carriage links 330 which are shown in the referenced figures as a first carriage link 332 and a second carriage link 334. Generally, each carriage link is coupled to the carriage 320. The carriage links 330 are also coupled to a plurality of die links 340 which are shown in the referenced figures as a first die link 342 and a second die link 344. More specifically, the first carriage link 332 is coupled to the carriage 320 by a first carriage pin 322. The second carriage link 334 is coupled to the carriage 320 by a second carriage pin 324. The first carriage link 332 is coupled to the first die link 342 by a first die link pin 352. The second carriage link 334 is coupled to the second die link 344 by a second die link pin 354. The first and second die links 342 and 344 are pivotally mounted by the shoulder post 355 extending between the side plates 360, 370. As will be understood, the carriage 320 and the carriage assembly which includes the carriage links 330 and the die links 340, are movably disposed within the interior of the tool head 310 and typically between the side plates 360 and 370. The die links are pivotally movable about the shoulder post 355.

Each die link 340, for example the first die link 342 and the second die link 344, includes an engagement face or component directed toward a movable die which in the present embodiment is shown in the referenced figures as a first or movable die 410. Instead of, or in addition to, the engagement face(s) of the die links, a component such as a roller may be used. However, it will be understood that the present subject matter includes a wide array of link assemblies having at least one engagement face or component for contacting and urging a movable die. Specifically, the first die link 342 defines an engagement face or roller face 346 and the second die link 344 defines an engagement face or roller face 348. The engagement face(s) or roller face(s) 346, 348 contact and engage one or more engagement or cam surfaces 412 associated with the first or movable die 410. In the embodiment shown in the referenced figures, the first or movable die 410 defines one or more cam region(s) 412 directed toward the engagement face(s) or roller face(s) 346, 348 of the die links 342, 344. It will be understood that in the illustrated tool head 310, the movable die 410 is shown having a circular engagement surface 412. In such versions, the outer surface is not exhibiting a cam function and so is more accurately referred to as an engagement surface. However, the present subject matter includes utilizing movable dies having irregular, oval, or elliptical outer surfaces 412 which would more accurately be termed a cam surface.

Referring further to FIGS. 12-16, operation of the tool head 310 is as follows. The tool head 310 is engaged with a press tool such as the previously noted RE 6 press tool. The press tool interface 314 of the tool head 310 is engaged with the press tool typically by inserting the cylindrical interface 314 into a receiving portion of the press tool. After engagement between the tool head 310 and the press tool, the press tool is actuated to linearly extend a ram or like member from the press tool, such as ram 302 depicted in FIG. 13. The ram 302 contacts the carriage 320 and urges the carriage 320 toward the distal end of the tool head 310 at which the dies 410, 420 are located. Linear movement of the carriage 320 results in pivotal movement of the carriage links 332, 334 about pins 322, 324 respectively; and also results in pivotal movement of the die links 342, 344 about the shoulder post 355. Such pivotal movement of the die links 342, 344 results in the first and second engagement faces 346 and 348 moving toward each other and corresponding linear movement of the first movable die 410 away from the shoulder post 355 and past the second and stationary die 420. Thus, as the carriage 320 advances linearly, the die links pivot about the shoulder post 355 and drive the movable die 410 past the stationary die 420. As will be understood, the assembly of the carriage 320, the carriage links 332, 334, the die links 342, 344, and engagement or cam region(s) 412 on the movable die 410, increase the linear force on the movable die 410 as compared to the linear advance force of the ram 302. This further increases the force exerted upon the moving die 410 as it is urged past the stationary die 420. As will be understood, this die arrangement and configuration can be used to shear or sever a workpiece previously placed within the dies 410, 420.

The tool head 310 also includes a stop assembly 500 for limiting linear travel of the movable die. Although a wide array of configurations and components can be used for the stop assembly 500, a useful assembly is depicted in FIGS. 12-16. The stop assembly 500 is located at a distal end of the tool head 310 and generally between the first and second side plates 360, 370. The stop assembly 500 includes a yoke 502 having a first yoke member 504 and a second yoke member 506. The first yoke member 504 is coupled to one end of the yoke 502 and the second yoke member 506 is coupled to another, opposite end of the yoke 502. If pivotal coupling is utilized, a first yoke pin 503 can be used to couple yoke components 502 and 504, and a second yoke pin 505 can be used to couple yoke components 502 and 506. Generally, the yoke 502 and yoke members 504, 506 are movably attached to the frame and positioned between the side plates 360, 370. The stop assembly 500 is adapted to limit linear movement of a die such as die 410, positioned in the tool head 310. Each yoke member 504, 506 defines a guide channel 508, 510, respectively, through which a standoff extends to limit linear travel of the yoke members and yoke 502 coupled thereto. Specifically, a first standoff 516 which is secured to the frame of the tool head 310 extends through the guide channel 508 defined in the yoke member 504. And, a second standoff 518 which is secured to the frame of the tool head 310 extends through the guide channel 510 defined in the yoke member 506. Thus, as will be understood, linear movement of the yoke 502 resulting from movement of the die 410 urged against the yoke 502, is limited by the length and location of the guide channels 508, 510 relative to the standoffs 516, 518. The tool head 310 and the associated stop assembly 500 can also include corresponding threaded member(s) 520 which are engaged with the standoffs 516, 518 and provide selective adjustment of the linear position of each standoff 516, 518 relative to its corresponding guide channel 508, 510. One or more biasing members such as springs (not shown) can be positioned in engagement with the yoke 502 and/or its yoke members 504, 506 to bias the yoke 502 into contact with the movable die 410.

The present subject matter also provides various tool systems utilizing the shear tools or tool heads. In many embodiments the tool systems comprise a power tool and the shear tool head which can be selectively engaged with the power tool. Nonlimiting examples of the power tool include press tools such as for example those described herein. The tool systems can also include one or more sets of dies that are utilized in conjunction with the tool heads. In many versions, the die sets include multiple pairs of dies in which each pair of dies includes openings shaped and sized to receive a particular workpiece such as strut channel having a certain cross sectional shape and/or size. In many versions, each pair of dies is interchangeable with other pair(s) in the die set. The present subject matter tool systems also optionally include interchangeable lever arm sets. As previously noted, a certain pair of lever arms may include a particular cam profile to impart desired force(s) on a die. Using interchangeable lever arm sets, another pair of lever arms could be used having a different cam profile to thereby provide a different force profile to the tool head. Similarly, the present subject matter includes tool heads using interchangeable carriages and/or link assemblies. And, as noted dies having outer engagement surfaces can be selectively profiled to exhibit a desired cam surface.

The present subject matter also provides methods of shearing a workpiece such as strut channel using the tool heads. Generally, the methods comprise providing a tool system such as the systems described herein. The methods also comprise inserting a workpiece in the dies used with the tool head. Prior to such insertion, the dies are aligned such that the openings in the dies are aligned for receiving the workpiece. The methods also comprise actuating the power tool such that the lever arms of the shear tool are pivotally displaced or the carriage and link assembly are displaced and cause movement of one die past the other to thereby shear the workpiece in the dies.

Figure 17:
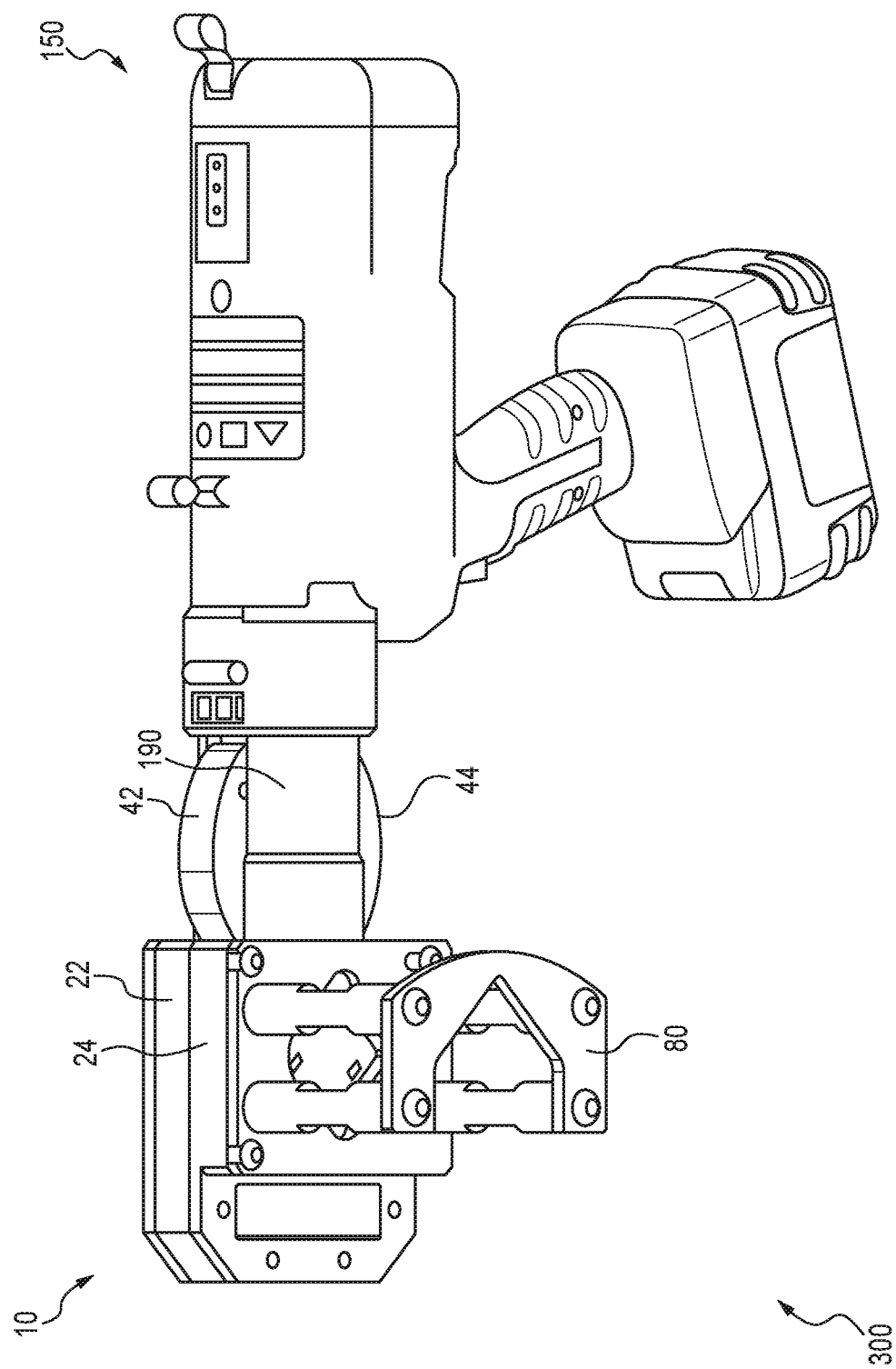
FIG. 17 is an illustration of a system in accordance with another embodiment of the present subject matter including a tool with a non-detachable tool head.

Although many embodiments of the present subject matter are in the form of a tool head that is selectively detachable or separable from a power assembly or power tool or press tool, it will be understood that the present subject matter also includes tools and/or tool systems on which the tool head or primary components thereof, is affixed or incorporated with a power tool such that the tool head or its primary components are not readily detachable or separable, i.e., non-detachable, from the remaining portion of the power tool. FIG. 17 schematically depicts a tool system 300 comprising a power assembly similar to the previously described power tool 170 and a non-detachable tool head 152.

The shear tools of the present subject matter address the problems noted with currently known shear tools and products. The advantages include the following.

The RIDGID RP340 and RE 6 power tools are not exclusively dedicated to pressing applications. Thus, the shear head tool attachment is one of several products that can be used with the noted power tool for a variety of applications. As a result, user investment to acquire a strut shearing system is limited to the cost of the attachment.

Although the RIDGID RP340 and RE 6 power tools can provide a force output that exceeds the force required to shear most commonly used strut, the shear heads of the present subject matter can multiply the 32 kN force available from the RP340 power tool and reach significantly greater capacities, for example 110 kN necessary for severing some struts.

In combination, the RIDGID RP340 and/or the RE 6 power tool and the strut shear head of the present subject matter require much less user effort than a saw system and associated deburring.

The strut shearing head of the present subject matter can be detached and carried separate from a power tool. Thus, the shear tool is readily transportable and can be moved with greater ease as compared to known strut shearing tools that must be transported as a whole unit.

Strut channel is almost always deformed on its factory cut ends due to its manufacturing process. The die profile typically used with the shear tool of the present subject matter is configured to allow even the misshapen factory cut ends to slide into the profile with ease while still maintaining a clean quality cut. Many competitive dies do not accept deformed or misshapen ends of strut channel.

The proximal ends of the lever arms that contact the die and their associated cam profile are configured such that the die will advance relatively fast with less force at the beginning of travel and then slow down and increase force as needed to shear through the bulk of the typical strut channel cross section. This configuration also allows for a hard stop on the return position of the moving die, so that the die is resting against a flat as the profile opening of the moving die aligns with the profile opening of the stationary die. Similar benefits can be realized using a tool head with a carriage and link assembly.

In certain embodiments, a slotted plate such as the previously noted second side plate 70, that holds the support arm bracket 80 can be slid down and then rotated out of the way of the dies so that the dies can quickly be changed. This configuration eliminates the need for complex system of hinges, springs, clips, etc. This configuration is such that there is no hardware loose or free from the shear head during die changing. This prevents inadvertent loss of parts.

Other lever arm type attachments for a press tool require pins and retaining rings to attach the lever arms to the lever arm side plates. The shear tool heads of the present subject matter have a lower manufacturing cost and simple affixment for keeping the lever arms retained with the side plates.

Currently available shearing options typically use a high force bench mount tool or a low force portable tool. The shear tool heads of the present subject matter provide a high force head that can be mounted to a stationary frame for bench top use or detached from the frame for portable use.

As previously noted, the strut shearing heads of the present subject matter can be detached and carried separate from a power tool. To detach many embodiments of the shear tool from the RIDGID RP340 power tool for example, the user merely pulls the lever arm pin on the power tool. To detach a shear tool from the RE 6 press tool, a user merely disengages the spring biased detent members.

Damage to the lever arm pin on the press tool is prevented by having a sleeve on the strut shearing head that rests in counterbores of the inside faces of the side plates. The lever arms pivot about the outer diameter of the sleeve. This configuration keeps the sliding action of the lever arm rotation off the lever arm pin of the press tool. In many embodiments, the sleeve is made of a hardened steel. Similar benefits exist with regard to tool heads using the carriage and link assembly.

As noted, the support arm bracket assembly keeps the cut on the strut straight. As the moving die moves forward, the die potentially pushes the strut to an angle before the strut begins to shear. The support arm bracket prevents this from occurring and holds the strut perpendicular to the shear plane.

In many embodiments, the shear tool head includes a hard stop that takes up the force of the press tool. In one version, upon full opening of the dies, the proximal ends of the lever arms contact the frame of the shear tool head so that force is axially transferred into a thick cross section of the frame. In other versions, the stop could be located where the moving die contacts a rigid component.

In many versions of the present subject matter tool head, provisions are included that provide a hard stop on the return position of the moving die, so that it is resting against a flat as the profile of the moving die aligns with the profile of the stationary die.

Another optional feature of the present subject matter tool head is a provision of a machined slot in the exterior of the tool head that is aligned with the mating plane of the dies so that a measuring tape can measure length from the shearing plane.

To prevent a pinch point, the shear head may include guards or other components that cover the location at which the back sides or proximal portions of the lever arms rotate up towards the head frame and hard stop. The guard and back surface of the lever arms are configured in such a way that the guards do not need to pivot, but yet still keep the gap less than 1/16 inch throughout the entire range of travel.

In certain embodiments, a torsion spring can be positioned around the pivot point sleeve between the two lever arms. Compression springs can also be positioned between a steel plate and the frame of the tool head that push the moving die back to its start position after the cycle is complete. The compression springs are positioned against a plate with nubs that position the springs.

In certain embodiments, a rounded outer profile of the tool head allows the tool head to be used with older or newer press tools or power tools that have different shapes or dimensions. This profile of the tool head maintains a line of contact with a work bench or other work surface.

In certain versions, dowel pins and/or similar members are used to keep the plates of the tool head that seat the two dies aligned. If one plate were to move a slight amount relative to the other, then the dies could potentially become misaligned with each other making it more difficult to feed strut in through the die profiles. Thus the dowel pins promote alignment of the dies.

As noted, strut channel is almost always deformed on the factory cut ends due to the manufacturing process. The cutting profile on the tools of the present subject matter allow even the misshapen cut ends to slide into the tool profile with ease while still maintaining a clean quality cut. Many competitive dies are not very forgiving with the ability to slide cropped ends into the tool.

Many other benefits will no doubt become apparent from future application and development of this technology.

All patents, applications, standards, and articles noted herein are hereby incorporated by reference in their entirety.

The present subject matter includes all operable combinations of features and aspects described herein. Thus, for example if one feature is described in association with an embodiment and another feature is described in association with another embodiment, it will be understood that the present subject matter includes embodiments having a combination of these features.

As described hereinabove, the present subject matter solves many problems associated with previous strategies, systems and/or devices. However, it will be appreciated that various changes in the details, materials and arrangements of components, which have been herein described and illustrated in order to explain the nature of the present subject matter, may be made by those skilled in the art without departing from the principle and scope of the claimed subject matter, as expressed in the appended claims.

What is claimed is:

1. A shear tool adapted to be driven by a power assembly, the shear tool comprising:
    a frame defining a first face, a second face oppositely directed from the first face, and an interior region, the interior region accessible from at least one of the first face and the second face, the frame including a distal end wall;
    a pair of pivotally movable lever arms affixed to the frame, each lever arm defining a proximal region for contacting an actuation member of the power assembly and a distal end directed to the interior region defined by the frame;
    wherein the interior region of the frame is sized to receive a first die positioned in the interior region and allow linear movement of the first die upon contact with the distal ends of the pair of lever arms;
    provisions for retaining a second die to the frame.

2. The shear tool of claim 1 further comprising:
    a first die and a second die, wherein each of the first die and the second die defines a profile sized and shaped to receive a strut channel inserted therein.

3. The shear tool of claim 2 wherein the second die is retained with the frame and the first die is positioned in the interior region of the frame.

4. The shear tool of claim 3 wherein the first die is movable within the interior region of the frame.

5. The shear tool of claim 1 further comprising:
    an arm bracket assembly affixed to the frame, the arm bracket assembly for supporting strut channel inserted in the interior region defined by the frame.

6. The shear tool of claim 1 wherein each lever arm of the pair of lever arms includes a cam surface in the proximal region for contacting the actuation member of the power tool.

7. The shear tool of claim 1 wherein the frame includes a first frame component defining a first portion of the interior region and a second frame component defining a second portion of the interior region, the first portion of the interior region sized and shaped to allow linear movement of the first die and the second portion of the interior region sized and shaped to retain the second die in a stationary position relative to the frame.

8. The shear tool of claim 1 wherein the shear tool is detachable from the power assembly, the frame including provisions for detachable engagement with the power assembly.

9. The shear tool of claim 8 wherein the provisions for detachable engagement with the power assembly include a sleeve extending along an axis about which the pair of lever arms are pivotally movable, the sleeve sized and shaped to receive a bolt to connect the shear tool to the power assembly.

10. The shear tool of claim 1 wherein the shear tool is non-detachable from the power assembly.

11. A tool system comprising:
    a power assembly including a body, a handle, and a motor;
    a shear tool including a frame defining a first face, a second face oppositely directed from the first face, and an interior region, the interior region accessible from at least one of the first face and the second face, the frame including a distal end wall, and the shear tool further including a pair of pivotally movable lever arms affixed to the frame, each lever arm defining a proximal region for contacting an actuation member of the power assembly and a distal end directed to the interior region defined by the frame, wherein the interior region of the frame is sized to receive a first die positioned in the interior region and allow linear movement of the first die upon contact with the distal ends of the pair of lever arms, and provisions for retaining a second die to the frame.

12. The tool system of claim 11 further comprising:
a first die and a second die, wherein each of the first die and the second die defines a profile sized and shaped to receive a strut channel inserted therein.

13. The tool system of claim 12 wherein the second die is retained with the frame and the first die is positioned in the interior region of the frame.

14. The tool system of claim 13 wherein the first die is movable within the interior region of the frame.

15. The tool system of claim 11 further comprising:
an arm bracket assembly affixed to the frame, the arm bracket assembly for supporting strut channel inserted in the interior region defined by the frame.

16. The tool system of claim 11 wherein each lever arm of the pair of lever arms includes a cam surface in the proximal region for contacting the actuation member of the power tool.

17. The tool system of claim 11 wherein the frame includes a first frame component defining a first portion of the interior region and a second frame component defining a second portion of the interior region, the first portion of the interior region sized and shaped to allow linear movement of the first die and the second portion of the interior region sized and shaped to retain the second die in a stationary position relative to the frame.

18. The tool system of claim 11 wherein the pair of lever arms is a first pair of lever arms, the tool system further comprising:
a second pair of lever arms interchangeable with the first pair of lever arms.

19. The tool system of claim 18 wherein the first pair of lever arms includes a first cam surface and the second pair of lever arms includes a second cam surface, the first cam surface exhibiting a different cam profile than the second cam surface.

20. The tool system of claim 11 wherein the power assembly further includes a battery or power pack.

21. The tool system of claim 11 wherein the shear tool is detachable from the power assembly, the frame including provisions for detachable engagement with the power assembly.

22. The tool system of claim 21 wherein the provisions for detachable engagement with the power assembly include a sleeve extending along an axis about which the pair of lever arms are pivotally movable, the sleeve sized and shaped to receive a bolt to connect the shear tool to the power assembly.

23. The tool system of claim 11 wherein the shear tool is non-detachable from the power assembly.

24. A shear tool adapted to be driven by a power assembly, the shear tool comprising:
a frame defining a first face, a second face oppositely directed from the first face, and an interior region, the interior region accessible from at least one of the first face and the second face;
a pair of pivotally movable lever arms affixed to the frame, each lever arm defining a proximal region for contacting an actuation member of the power assembly and a distal end directed to the interior region defined by the frame, each lever arm of the pair of lever arms includes a cam surface in the proximal region for contacting the actuation member of the power assembly;
wherein the interior region of the frame is sized to receive a first die positioned in the interior region and allow linear movement of the first die upon contact with the distal ends of the pair of lever arms;
provisions for retaining a second die to the frame.

25. The shear tool of claim 24 further comprising:
a first die and a second die, wherein each of the first die and the second die defines a profile sized and shaped to receive a strut channel inserted therein.

26. The shear tool of claim 25 wherein the second die is retained with the frame and the first die is positioned in the interior region of the frame.

27. The shear tool of claim 26 wherein the first die is movable within the interior region of the frame.

28. The shear tool of claim 24 further comprising:
an arm bracket assembly affixed to the frame, the arm bracket assembly for supporting strut channel inserted in the interior region defined by the frame.

29. The shear tool of claim 24 further comprising a dampening system adjacent an end wall of the frame.

30. The shear tool of claim 24 wherein the frame includes a first frame component defining a first portion of the interior region and a second frame component defining a second portion of the interior region, the first portion of the interior region sized and shaped to allow linear movement of the first die and the second portion of the interior region sized and shaped to retain the second die in a stationary position relative to the frame.

31. The shear tool of claim 24 wherein the shear tool is detachable from the power assembly, the frame including provisions for detachable engagement with the power assembly.

32. The shear tool of claim 31 wherein the provisions for detachable engagement with the power assembly include a sleeve extending along an axis about which the pair of lever arms are pivotally movable, the sleeve sized and shaped to receive a bolt to connect the shear tool to the power assembly.

33. The shear tool of claim 24 wherein the shear tool is non-detachable from the power assembly.

34. A tool system comprising:
a power assembly including a body, a handle, and a motor;
a shear tool including (i) a frame defining a first face, a second face oppositely directed from the first face, and an interior region, the interior region accessible from at least one of the first face and the second face, (ii) a pair of pivotally movable lever arms affixed to the frame, each lever arm defining a proximal region for contacting an actuation member of the power assembly and a distal end directed to the interior region defined by the frame, each lever arm of the pair of lever arms includes a cam surface in the proximal region for contacting the actuation member of the power assembly, the interior region of the frame sized to receive a first die positioned in the interior region and allow linear movement of the first die upon contact with the distal ends of the pair of lever arms, and (iii) provisions for retaining a second die to the frame.

35. The tool system of claim 34 further comprising:
a first die and a second die, wherein each of the first die and the second die defines a profile sized and shaped to receive a strut channel inserted therein.

36. The tool system of claim 35 wherein the second die is retained with the frame and the first die is positioned in the interior region of the frame.

37. The tool system of claim 36 wherein the first die is movable within the interior region of the frame.

38. The tool system of claim 34 wherein the power assembly further includes:
a battery or power pack.

39. The tool system of claim 34 further comprising:
an arm bracket assembly affixed to the frame, the arm bracket assembly for supporting strut channel inserted in the interior region defined by the frame.

40. The tool system of claim 34 wherein the frame includes a first frame component defining a first portion of the interior region and a second frame component defining a second portion of the interior region, the first portion of the interior region sized and shaped to allow linear movement of the first die and the second portion of the interior region sized and shaped to retain the second die in a stationary position relative to the frame.

41. The tool system of claim 40 the first frame component includes a first proximal region and a second proximal region, each proximal region partially extending about a proximal region of a first die positioned in the interior region of the first frame component, wherein each proximal region of the first frame component includes an inclined surface oriented toward the pair of lever arms.

42. The tool system of claim 34 wherein the pair of lever arms is a first pair of lever arms, the tool system further comprising:
a second pair of lever arms interchangeable with the first pair of lever arms.

43. The tool system of claim 42 wherein the first pair of lever arms includes a first cam surface and the second pair of lever arms includes a second cam surface, the first cam surface exhibiting a different cam profile than the second cam surface.

44. The tool system of claim 34 wherein the shear tool is detachable from the power assembly, the frame including provisions for detachable engagement with the power assembly.

45. The tool system of claim 44 wherein the provisions for detachable engagement with the power assembly include a sleeve extending along an axis about which the pair of lever arms are pivotally movable, the sleeve sized and shaped to receive a bolt to connect the shear tool to the power assembly.

46. The shear tool of claim 34 wherein the shear tool is non-detachable from the power assembly.

* * * * *